United States Patent
Wangemann et al.

(10) Patent No.: US 10,601,349 B2
(45) Date of Patent: Mar. 24, 2020

(54) ACTUATING APPARATUS FOR A MOTOR AND METHOD FOR ACTUATING A MOTOR

(71) Applicants: Airbus Defence and Space GmbH, Taufkirchen (DE); Airbus Operations GmbH, Hamburg (DE)

(72) Inventors: Joerg Wangemann, Magdeburg (DE); Heiko Rothkranz, Osdorf (DE); Jens Schult, Hamburg (DE)

(73) Assignees: Airbus Defence and Space GmbH (DE); Airbus Operations GmbH (DE)

( * ) Notice: Subject to any disclaimer, the term of this patent is extended or adjusted under 35 U.S.C. 154(b) by 0 days.

(21) Appl. No.: 15/834,391

(22) Filed: Dec. 7, 2017

(65) Prior Publication Data

US 2018/0159449 A1 Jun. 7, 2018

(30) Foreign Application Priority Data

Dec. 7, 2016 (DE) .................. 10 2016 123 707

(51) Int. Cl.
*H02P 21/06* (2016.01)
*H02P 21/18* (2016.01)
(Continued)

(52) U.S. Cl.
CPC ............ *H02P 6/16* (2013.01); *G01D 5/243* (2013.01); *H02M 7/5395* (2013.01); *H02P 6/14* (2013.01);
(Continued)

(58) Field of Classification Search
CPC ............ H02P 27/08; H02P 21/10; H02P 6/17
See application file for complete search history.

(56) References Cited

U.S. PATENT DOCUMENTS

| 5,194,796 A | 3/1993 | Domeki et al. |
| 2003/0193306 A1 | 10/2003 | Griffitts |

(Continued)

FOREIGN PATENT DOCUMENTS

| DE | 102011004817 A1 | 12/2011 |
| DE | 102012013652 A1 | 11/2013 |
| DE | 102012222311 A1 | 6/2014 |

OTHER PUBLICATIONS

Cicily Antony T. et al., "Fault Tolerant Capability of Five Phase BLDC Motor with Ten Step Commutation", the International Journal of Advanced Research in Electrical, Electronics and Instrumentation Engineering, vol. 3, Special Issue 5, Dec. 2014, pp. 374-381.

(Continued)

*Primary Examiner* — Bickey Dhakal
*Assistant Examiner* — Charles S Laughlin
(74) *Attorney, Agent, or Firm* — Lerner, David, Littenberg, Krumholz & Mentlik, LLP

(57) ABSTRACT

A motor actuating apparatus includes three phase connections for three motor phase connections, a high-connection for a supply voltage and a low-connection for a reference potential of the supply voltage, three bridge branches having a series connection of a high-switch and a low-switch and a control device for actuating the switches of the bridge branches. The high-switches are connected to the high-connection and the low-switches are connected to the low-connection. Each of the three phase connections is connected to exactly one of the three bridge branches between the high-switch and the low-switch. The control device is adapted for actuating the switches of the bridge branches such that during a first time period a first phase connection is switched to passive and the second phase connection and third phase connection are alternatingly connected to the high-connection and the low-connection in a predeterminable duty cycle if the supply voltage is applied.

10 Claims, 6 Drawing Sheets

(51) Int. Cl.
| | |
|---|---|
| H02P 23/14 | (2006.01) |
| H02P 6/16 | (2016.01) |
| H02P 6/182 | (2016.01) |
| H02P 6/14 | (2016.01) |
| H02P 6/28 | (2016.01) |
| G01D 5/243 | (2006.01) |
| H02M 7/5395 | (2006.01) |
| H02P 101/30 | (2015.01) |

(52) U.S. Cl.
CPC ............ *H02P 6/182* (2013.01); *H02P 6/28* (2016.02); *H02P 2101/30* (2015.01)

(56) References Cited

U.S. PATENT DOCUMENTS

| | | | |
|---|---|---|---|
| 2007/0031131 A1 | 2/2007 | Griffitts | |
| 2011/0221367 A1 | 9/2011 | Perisic et al. | |
| 2014/0028237 A1* | 1/2014 | Park | H02P 27/06 318/504 |
| 2014/0152219 A1 | 6/2014 | Niederer et al. | |
| 2015/0054441 A1 | 2/2015 | Schwarzkopf | |
| 2015/0270797 A1 | 9/2015 | Roesner | |
| 2017/0019043 A1* | 1/2017 | Zhao | H02P 21/26 |

OTHER PUBLICATIONS

Gamaz-Real et al., "Position and Speed Control of Brushless DC Motors Using Sensorless Techniques and Application Trends", Department of Signal Theory, Communications and Telematic Engineering, University of Valladolid, from the journal sensors 2010,10, ISSN 1424-8220, Published Jul. 19, 2010, pp. 6901-6947.

George et al., "A Comparison of Three Phase and Five Phase BLDC Motor", the International Journal of Advanced Research in Electrical, Electronics and Instrumentation Engineering, vol. 2, Special Issue 1, Dec. 2013, pp. 479-486.

http://www.ti.com/lit/ml/sprt647/sprt647.pdf, "Breakthrough InstaSPIN™—FOC motor control technology is here!", Texas Instruments, Copyright 2013, 3 pages.

Kennel et al., "Sensorless Position Control of Permanent Magnet Synchronous Machines without Limitation at Zero Speed", IECON 02 [Industrial Electronics Society, IEEE 2002 28th Annual Conference of the], p. 674-679, vol. 1, ISBN 0-7803-7474-6, Nov. 5, 2002.

Kennel et al., "Sensorless speed and position control of synchronous machines using alternating carrier injection", Electric Machines and Drives Conference, 2003, IEMDC'03, IEEE International, vol. 2, p. 1211-1217, vol. 2, ISBN 0-7803-7817-2, Jun. 1, 2003.

López et al., "Multilevel Multiphase Space Vector PWM Algorithm", IEEE Transactions on Industrial Electronics, vol. 55, No. 5, May 2008, pp. 1933 to 1942.

Reill, Josef, the dissertation "Position-sensorless control for an accelerometer-supported, highly dynamic robot drive system with a permanently excited synchronous motor", Dr. Hut Verlag, ISBN 978-3-86853-495-5, Jun. 2010, Chapters 6 and 7.

Wang et al., "Position Self-Sensing Evaluation of Novel CW-IPMSMs with an HF Injection Method", IEEE Transactions on Industry Applications, vol. 50, No. 5, Sep./Oct. 2014, pp. 3325-3334.

Wangemann, Jörg et al., https://github.com/joewa/bldc-strip/blob/master/README.md, Jul. 2016, 7 pages.

* cited by examiner

ACTUATING APPARATUS FOR A MOTOR AND METHOD FOR ACTUATING A MOTOR

FIELD OF THE INVENTION

The present invention relates to the technical field of aviation and aerospace. In particular, the present invention relates to an actuating apparatus for a motor, to a motor control system, to a method for actuating a motor, a program element and a computer readable storage medium.

BACKGROUND OF THE INVENTION

Brushless direct current motors ensure that a rotational movement is maintained in that, after a specific angle of rotation has been covered, they ensure that the direction of current is reversed. This reversal of the direction of current is referred to as commutation. In order to be able to commutate at the right time, sensors, for example a Hall sensor, are provided in direct current motors and make it possible to evaluate the current angle of rotation. However, there are also variants which manage without sensors and, in this case, use the existing phases by means of skilled actuation to determine the current rotary position of the rotor in relation to the stationary stator by means of the electromotive force (EMF) produced by induction.

In the case of brushless direct current motors or synchronous motors, the rotor field and stator field must be adapted to one another, i.e. the fields must be synchronous and thus also change together with the speed.

Furthermore, it is possible to distinguish direct current machines comprising commutators and brushes from brushless direct current machines (brushless DC motor, BLDC) which are constructed in the manner of a three-phase synchronous machine. Three-phase synchronous machines can be excited electrically or by means of permanent magnets. In the case of electrically excited synchronous machines, the energy transmission into the rotor can also take place by means of slip rings and brushes.

Since the commutation time in the case of sensorless direct current motors takes place according to the induction or the rotor angle, special effort is required to start up the motor from standstill, to slowly rotate it or to brake it.

The article 'Position and Speed Control of Brushless DC Motors Using Sensorless Techniques and Application Trends' by José Carlos Gamazo-Real et. al., 19 Jul. 2010, Department of Signal Theory, Communications and Telematic Engineering, University of Valladolid, from the journal sensors 2010, ISSN 1424-8220, deals with the position and speed control of brushless direct current motors.

The dissertation 'Position-sensorless control for an accelerometer-supported, highly dynamic robot drive system with a permanently excited synchronous motor' by Josef Rill, Dr. Hut Verlag, ISBN 978-3-86853-495-5, June 2010, in chapter 6 describes an EMF (electromotoric force) process which is used only above a minimum speed of the machine, at which speed the induced voltage is present at a sufficient amplitude, and in chapter 7 describes a test signal process.

The article 'Position Self-Sensing Evaluation of Novel CW-IPMSMs with an HF Injection Method' by Xiaocan Wang et. al. in IEEE Transactions on Industry Applications, vol. 50, no. 5, September/October 2014 relates to a synchronous machine comprising permanent magnets which uses an HF injection process.

The document https://github.com/joewa/blde-strip/blob/master/README.md from July 2016 describes a project by Jorg Wangemann, Heiko Rothkranz et. al. for electronic speed control for a brushless DC motor (brushless DC, BLDC).

The article 'Fault Tolerant Capability of Five Phase BLDC Motor with Ten Step Commutation' by Cicily Antony T et. al. from the International Journal of Advanced Research in Electrical, Electronics and Instrumentation Engineering, vol. 3, Special Issue 5, December 2014 describes a ten-step commutation logic for a BLDC motor which has five phases and a Hall sensor and compares the results with a four-phase and three-phase motor.

The document http://www.ti.com/lit/ml/sprt647/sprt647.pdf from 2013, USA, with document number SPRT647, describes the InstaSPIN™ FOC (field oriented control) control technology from Texas Instruments for synchronous (e.g. BLDC) or asynchronous (e.g. AC induction) motors which use the FAST™ (flux, angle, speed, torque) technology.

The article 'A Comparison of Three Phase and Five Phase BLDC Motor' by Kiran George et. al. from the International Journal of Advanced Research in Electrical, Electronics and Instrumentation Engineering, vol. 2, Special Issue 1, December 2013, describes the ripple of a five-phase BLDC motor in comparison with a three-phase motor.

The article 'Sensorless speed and position control of synchronous machines using alternating carrier injection' by Ralph Kennel et. al. from the Electric Machines and Drives Conference, 2003, IEMDC'03, IEEE International, volume 2, p. 1211-1217, vol. 2, ISBN 0-7803-7817-2, 1 Jun. 2003, proposes a specific injection model using predefined injection angles.

The article 'Sensorless Position Control of Permanent Magnet Synchronous Machines without Limitation at Zero Speed' by Ralph Kennel et. al. from IECON 02 [Industrial Electronics Society, IEEE 2002 28th Annual Conference of the], volume 1, p. 674-679, vol. 1, ISBN 0-7803-7474-6, 5 Nov. 2002, describes a sensorless control algorithm for SMPMS machines (surface mounted permanent magnet synchronous machines) which uses a high-frequency voltage injection.

BRIEF SUMMARY OF THE INVENTION

It may be desirable to allow efficient operation of a direct current motor.

According to one aspect of the present invention, an actuating device for a motor, a motor control system, a method for actuating a motor, a program element and a computer-readable storage medium are described.

According to a further aspect of the present invention the actuating apparatus for a motor comprises at least three phase connections for connecting a phase of the motor each. The actuating device may be realized in the form of a DC voltage converter, an inverter or a motor control unit (MCU). The actuating apparatus further comprises a high-connection for applying a supply voltage, in particular for applying the high potential of the supply voltage. Furthermore, the actuating apparatus comprises a low-connection for applying a reference potential of the supply voltage. The supply voltage may be a DC voltage and may therefore be referred to as a battery voltage $U_B$. The supply voltage may thus also be for example the voltage of a battery by which the positive pole is connected to the high-connection, and the negative pole is connected to the low-connection. In addition to this the actuating apparatus comprises at least three bridge sections, each having a series connection of a high-switch and a low-switch and a control device for actuating the switches of the bridge sections. The high-switch of each of the bridge sections is connected to the high-connection and the low-switch of each of the bridge sections is connected to the low-connection.

Each of the at least three phase connections each is connected to exactly one of the at least three bridge branches between the high-switch and the low-switch of the respective bridge branch. In other words, a phase connection, a phase terminal or a terminal is connected to a high-switch and a low-switch each, such that each phase connection comprises one uniquely assigned high-switch and one respective low-switch. The control device or the processor is designed for actuating the switches of the bridge branches in such a way that during a first time period a first phase connection of the three phase connections is switched to passive and the second and third phase connections are alternatingly connected to the high-connection and the low-connection in a predeterminable duty cycle, if the supply voltage is applied. Further, the control device is designed for measuring a first induced voltage differential in the passive first phase connection during the first time period and to create a first induced voltage differential from the induced voltages during the alternating connections.

The actuating apparatus can be used for switched reluctance motors (SR drive or SRM). Reluctance motors of this type may have a different number of salient teeth (salience) on the rotor and stator. The stator teeth are wound with coils. Said coils are organized in individual phases. The phases and thus the coils are switched on and off alternately. The teeth or poles having the energized windings or the energized coils, i.e. the active phases, each attract the closest teeth of the rotor in the manner of an electromagnet and are switched off when (or shortly before) the teeth of the rotor are opposite the stator teeth attracting them. In this position or rotary position, the next phase is switched to different stator teeth which attract different rotor teeth. The switching time from one phase to the other phase can also be referred to as the commutation time or commutation condition. In one example, a switched reluctance motor has three or more phases which can be connected to the phase connections of the actuating apparatus. However, an actuating apparatus for a motor can also be constructed with only two or one phase.

In order to switch or commutate at the right time, the machine can be provided with a rotor position sensor, for example a Hall sensor. However, the actuating apparatus according to the invention allows the operation of sensorless (or self-sensing) motors. A sensorless control method is thus achieved by means of the actuating apparatus. A sensorless control method can evaluate the stator current, the voltage on phase connections switched to passive, or the torque of the motor as a commutation condition. The control unit may alternatively or additionally evaluate a voltage differential $\Delta U$ between phase switching states as a commutation condition. Reluctance motors which are operated by the actuating apparatus may be characterized by high robustness and simple constructions. Similarly to an asynchronous machine, a reluctance motor in the non-energized state during a rotation, for example by an external force, i.e. a manual rotation of the rotor, forms substantially no torque. However, remnant magnetization may often lead to low cogging torque in the de-energized state. At low speeds the sole evaluation of the torque may thus be very imprecise thanks to the low torque density due to the low number of creatable pole pairs and does not allow for a good determination of a commutation time. At a high speed, however, by evaluating the current through the phase connections or the voltage on a phase connection switched to passive, the commutation time can be efficiently established. Taking into account the voltage differential $\Delta U$ as a commutation condition in the DDIS process can make it possible to determine the commutation time very precisely when at a standstill, at low speeds and at medium speeds. In addition, the DDIS process can make it possible to quickly detect the rotary position, which can also allow a fast start up of the rotational movement of the motor in the desired direction.

Generally, a voltage may be induced on the basis of the self-inductance of a coil during a change in current. In one example, a first voltage $U_1$, which may be induced by alternating active phase connections, may be measured at a branch point of the phase connection switched to passive, which can be located between the two active phase connections. Said voltage can be measured either between a star point or Y point of a motor and reference potential or between the phase connection switched to passive and the reference potential. In an example, the voltage may also be measured between the phase connection switched to passive of a motor connected in delta. Afterwards, the polarity of the active phases may then be reversed and a second voltage $U_2$ may be detected. A voltage differential $\Delta U_1$ or a voltage delta $\Delta U$ can be determined from the difference between $U_1$ and $U_2$.

The effect of an EMF brought about by the magnetic induction of a permanent magnet in motion or a coil in the passive phase may be minor or may be cancelled out when the voltage differential is formed, and therefore said effect becomes substantially unnoticeable in comparison with the effect brought about as a result of the change in current in the case of bipolar actuation of a bridge circuit. Thus, in another example, a first voltage $U_1$ may be determined by alternately activating the phase connections and in particular the changes in current brought about thereby in the individual bridge circuits. In the case of a changing current i corresponding to $$\frac{di}{dt},$$

all induced voltage $$U = L\frac{di}{dt}$$

is produced (self-inductance). The voltage is proportional to the magnitude of the inductance and the change in current. In this case, the magnitude of the inductance L is dependent on the shape of the coil and the flux permeating said coil. In the case of an electric motor, reactances in the form of inductances are produced by the phase windings. The magnitude of the resulting inductances depends for example on the arrangement of the stator relative to the rotor, since the shape of the magnetic flux lines can be affected by said arrangement. In particular, distances between the metal cores of the stator and/or the rotor affect the magnitude of the resulting inductance. Since the distances depend on the angles of rotation of the stator relative to the rotor, the inductance is likewise dependent on the angle of rotation. This dependence on distance may be expressed as what are known as salience effects and magnetic saturation effects. The fact that, due to the pole windings, protrusions are produced on the stator and/or rotor which can lead to changes in the distance and thus to changes in the magnetic fluxes guided by the cores of the poles may be referred to as a salience effect. In the case of the three-phase motor, there are substantially always two active phases or active coils or active phase connections which are affected differently by the magnetic flux. Therefore, voltage shapes which are different according to the angle of rotation can be produced on the individual active phases.

Since the passive phase and/or the passive phase connection is substantially separated from the supply voltage and the reference potential and/or switched to high-impedance relative to the reference potential, a current substantially cannot flow through the phase switched to passive and/or through the phase connection. In particular the passive phase at a motor in a star connection, i.e. at a motor, at which all phases are connected in a branch point, may be separated from the supply voltage and the reference potential. In another example the passive phase connection at a motor in a delta connection, i.e. at a motor, at which each phases are connected to a phase connection at both ends, may be separated from the supply voltage and the reference potential. Hence, the direct current or battery current, which is converted into an alternating current by means of the bridge circuit, substantially flows through both active phases and/or both active phase connections. In a branch point, in which the phases of the motor are connected to each other, a voltage can be measured to ground or to a reference potential. The voltages, from which an evaluation signal is generated, for example $U_1$, $U_2$, may each be measured from the branching point and/or from the passive terminal to the reference potential, for example GND. Through combining the phases in a branching point, an inductive voltage divider is created through the reactances of the combined phases. Under the precondition of a similar design of the active phase branches, their inductance may substantially be equal. Hence, at the branching point a voltage of $U_B/2$ follows for the case that the inductance component $L_S=L_Q-L_D$, which is created from the longitudinal inductance $L_D$ and the transverse inductance $L_Q$ and which is dependent on the rotor position, is zero. In the case of the inductance component $L_S=L_Q-L_D$, which is created from the longitudinal inductance $L_D$ and the transversal inductance $L_Q$ and which is dependent on the rotor position, differing from zero, a voltage between Y and ground is created at the branching point, which differs from $U_B/2$. The phase connection, which is switched to passive, may be located between both active phase connections. The voltage $U_1$ may either be measured between a star point or Y point of a motor and a reference potential or between the phase connection switched to passive and the reference potential. The voltage $U_1$ may thus be measured in a "lower" section of the voltage divider in relation to the reference potential. In an example the voltage $U_1$ may also be measured at the phase connection switched to passive of a motor in a delta connection. However, during the voltage measurement it should substantially be prevented that for the measurement a current flows through the phase switched to passive, through the phase connection switched to passive and/or the terminal switched to passive. After the measurement of $U_1$, which is conducted while the first switching state is present, the polarity of the active phases may be reversed in a second switching state and a second voltage $U_2$ between the Y point and the reference potential or between the phase connection switched to passive and the reference potential, respectively, may be detected. The polarity of the active phases may be reversed in that the actuating apparatus provides for connecting the respective other phases and/or phase connections with the supply voltage (high) and the reference potential (low). The supply voltage may be referred to as high state and the reference potential as low state. From the difference between the $U_1$ and $U_2$ detected at different times a voltage difference $\Delta U$ or a voltage delta $\Delta U$ may be determined. By recording the resulting voltage differences over time, a time-dependent development of the voltage differences may result.

The resulting voltage $\Delta U$ difference at different times may be useful for the determination of the commutation time of a commutation process and may depend on the design and the operating state of the machine. Characteristics of a motor connected to the phase connections may be derived from the $\Delta U$, with the aid of which the commutation times for the respective motor may be adjusted. Hence, a commutation process may be automatically adjusted to a motor type. A commutation process, which uses the voltage difference of two switching states of active phases in order to derive a commutation condition, may be referred to a Direct Delta Induction Sensing (DDIS) commutation process. In particular, the DDIS method may be designed in a way that the motor parameter and commutation conditions can be determined at a low rotational speed or at a standstill. Since at this DDIS method the influence of the motor parameter, i.e. for example the distances of the poles and/or the phase windings of the stator and/or the rotor, are included into the determination of the voltage difference $\Delta U$ and in particular into the change of the inductance during rotation of the motor, a commutation process can be adjusted to the determined motor parameters.

Thus, for example in a start interval or in a detection interval a voltage difference $\Delta U$ or a parameter $k_1$ derived therefrom may be used as a commutation indicator for a subsequent commutation process. In other words, a voltage difference $\Delta U$ that is characteristic for a motor, can be determined in a start interval and handed over to a commutation process, such that the commutation process for a motor, which is just connected to the actuation apparatus, operates effectively and switches at commutation times suitable for this type of motor. By structural deviation even identically manufactured types of motor may require different commutation times, in order to effectively operate exactly this individual type of motor. Such structural deviations can be detected with the DDIS method and can be considered at the actual commutation, without having to manually intervene into the method and having to fixedly adjust parameters or switching thresholds, for example in the form of constants. In fact, the method can automatically determine the switching thresholds, for example $k_1$, and thus the switching thresholds may be provided in the form of variables, which are defined during the program duration of a control program depending on the determined motor parameters.

In still other words, different values of $\Delta U$ on different characteristic $\Delta U$ curve progressions at the same angle may be measured through switching different phases to passive. The angle may be the same for the different measurements, as it is taken care that the motor does not rotate when the different measurements are conducted. The measurement values lying on the different curves can then be assumed to be measured on a single curve, since the curve progressions of the different phases substantially comprise the same shape, but a known phase shift. By including the phase shift, the $\Delta U$ values determined for a fixed angle on different curves may be assumed as nodes of a single curve, which are locally distanced by the phase shift. Thus, this single curve of the voltage differences can be constructed numerically or by table evaluation of stored values.

If the single curve is constructed, also the angles at which it should be commutated, can be determined. For example, the maximum value of the voltage differential and/or the normed voltage differential can be determined from the constructed curve of the voltage differential values, which may comprise a sine shape. The commutation time may lie in the near of the maximum of the voltage differential and/or the normed voltage differential. This value can be defined as threshold value $k_1$ and can define the commutation angle and/or the commutation times. By defining the threshold value $k_1$ it can happen that the commutation is conducted slightly too early in comparison to optimum commutation angles. However, through appropriate measures, $k_1$ can be determined in a way that it is commutated in proximity to the optimum commutation angle. For example, $k_1$ can be defined as the value ⅔ of the maximum value of the voltage differential and/or of the normed voltage differential. In another example, the value $k_1$ can be determined as the value of the voltage differential and/or of the normed voltage differential, which results at a rotational angle of 210° on the constructed curve. If the commutation angle is determined, all other commutation angles can be determined due to the constant phase shift. At a 6-step-commutation the phase shift can be 60°.

According to another aspect of the present invention a motor control system is described, which comprises the actuation apparatus according to an embodiment of the invention and a motor having at least three phases, wherein each of the three phase connections of the actuating apparatus is connected to one of the at least three phases.

The motor control system forms a motor control unit together with a motor. By providing phase connections for the phase windings of a motor, different types and constructions of motors can be connected to the actuating apparatus. The actuating apparatus may be able to detect the motor parameters of the connected motor, for example by means of the DDIS method, in order to at least partially hand them over to a control program for the motor control. Fields of application for the motor control system are, for example, an electrically driven vehicle, an angle- or position-controlled actuator, a drive system for example for a pump or for a fly-by-wire control in an aircraft.

According to an aspect of the present invention, an aircraft comprising the actuating apparatus is specified.

According to a still further aspect of the present invention a method for actuating a motor is provided. This method may comprise applying a supply voltage to a high-connection and applying a reference potential of the supply voltage at a low-connection of a bridge circuit having at least three bridge branches, each having a series connection of a high-switch and a low-switch. The high-switch of each one of the bridge branches is connected to the high-connection. The low-switch of each one of the bridge branches is connected to the low-connection. The bridge branches, in which the high-switches and/or the low-switches are switched may be referred to as active bridge branches. The bridge branch, in which a switching is not conducted may be referred to as passive bridge branch. The passive bridge branch may be used for measurements.

Each of the at least three bridge branches between the high-switch and the low-switch of the respective bridge branch is connected to a phase connection each. The method further comprises the actuating of the switches in the bridge branches in such a way that during a first period of time a first phase connection of the three phase connections is switched to passive and the second and third phase connection are alternatingly connected to the high-connection and the low-connection in a predeterminable duty cycle. Then a measurement of a first induced voltage differential is conducted in the passive first phase connection. The measurement is conducted during the first period of time.

The current rotational position of the rotor may be derivable from the measured voltage differential. The knowledge of the actual rotational position may allow the actuating device to energize the phase connections in such a manner that a motor connected thereto substantially immediately starts to rotate.

In the context of this text, the term "first phase connection", "second phase connection" and "third phase connection" may be used merely as a convention to distinguish between various phase connections. The physical characteristics of the phase connections may be substantially the same, and therefore any phase connection can assume the role of the first phase connection, the second phase connection or the third phase connection.

According to another aspect of the present invention, a program element is specified which has a program code which, when executed by a processor carries out the method according to the invention.

According to another aspect of the present invention, a computer-readable memory medium is specified, on which a program code is stored and which, when executed by a processor, carries out the method according to the invention.

A floppy disc, a hard drive, a USB (universal serial bus) memory device, a RAM (random-access memory), a ROM (read-only memory) or an EPROM (erasable programmable read-only memory) may be used as a computer-readable memory medium. As a memory medium, an ASIC (application-specific integrated circuit) or a FPGA (field-programmable gate array) can also be used, as well as SSD (solid-state-drive) technology or a flash-based memory medium. A web server or a Cloud can also be used as a memory medium. As a computer-readable memory medium, a communications network may also be considered, such as the Internet, which may allow a program code to be downloaded. Wireless network technology and/or wired network technology can be used.

The described device and/or the described method can be used for self-sensing or sensorless reluctance machines and/or synchronous machines. When a motor, in particular an electric motor, is to be started or is to rotate slowly, it should be noted in which position the rotor is oriented relative to a stator in order to be able to reverse or commutate the current direction at the right position and/or in order to allow the right force in terms of magnitude and direction to act on the rotor. In the case of a synchronous motor, it is provided for example that the driving magnetic field runs ahead of the rotation of the rotor by 90° in order to pull the rotor behind and to drive the motor by means of said pulling.

In order to control the force which a direct current motor having brushes can apply, the direct current motor can be operated with at least two phases which are switched in an alternating manner by means of a bridge circuit. The alternating switching is referred to as bipolar PWM (pulse width modulation) mode. In this operating mode, a duty cycle between the on time and the off time can be used to control the applied force or the current of the motor, respectively. With a brushless direct current motor the respective proper phases and/or bridge branches in the right polarity must be switched to active depending on the position of the rotor.

By means of the alternating operation of the two active connections with a duty cycle of 50%, it can be ensured that, on average, no voltage and no current and thus also no torque is generated in the stationary or slowly rotating motor. The rotational state of the motor may thus be substantially unaffected. Nevertheless, a voltage differential ΔU can be produced by induction, from which the current motor position and corresponding commutation behaviour can be derived. In particular, the ΔU at a predeterminable position or the threshold $k_1$, respectively, can be considered a motor characteristic, and the determined value of the voltage differential ΔU can be used as a switching threshold $k_1$, commutation condition of commutation parameter for a commutation process. The switching threshold $k_1$ may thereby be handed over to a commutating method as variable or parameter. If during execution of the commutation process it is detected, that a currently measured voltage differential ΔU exceeds the limit or the switching threshold $k_1$ for the voltage differential, a new passive phase can be chosen.

The state duration, during which for example the second phase is connected to the high-connection or during which the second phase is switched to high, may be referred to as S1. During this high state of the second phase the third phase may be connected to the low-connection or switched to low. The state duration of the subsequent alternating state, during which for example the third phase is connected to the high-connection or in which the third phase is switched to high, may be referred to as S2. In this state the second phase may be connected to the low-connection. The ratio of S1 and/or of S2 to the total duration S1+S2 may be referred to as duty cycle d. If S1 has the same duration as S2, a duty cycle of 50% results. A duty cycle of 50% may not lead to a change of a rotational motion of the motor, such that the rotation of a motor at a standstill or of a motor rotating slowly is substantially unaffected. In other words, a duty cycle of 50% may not create a torque. For this reason a duty cycle of 50% may be referred to as a balanced duty cycle. However, a voltage differential ΔU in the passive phase can be determined from the voltages detected during S1 or S2, respectively. This voltage differential may allow for a conclusion about the ratios of the inductances of the coils of the motor phases in relation to a stator. In other words, the ΔU may be a ratio of the inductances switched to the reference potential at different times. Thus, a rotational angle of the rotor may be derivable from the measured voltage differential ΔU.

In particular, the determined ΔU may be used as a switching threshold for a commutation process. Said ΔU may depend on the construction of a motor, which is connected to the actuating apparatus. In this way, a commutation process can be automatically adapted to the determined motor parameters.

Through measuring a voltage differential in two switching states via a voltage divider, a current measurement, in particular the measurement of a current rise, can be prevented, as the formula $$u = L\frac{di}{dt}$$

defines that the voltage depends on the current progression. A voltage measurement is realizable technically simply with a high precision and the ambitious measurement and evaluation of a current rise for determining the inductance can be prevented.

According to an aspect of the present invention the actuating device is adapted for determining a position of the rotor and/or a commutation condition for the rotation of the motor connected to the phase connections from the ratio of the measured first induced voltage differential and the provided supply voltage.

By reference to the supply voltage, the voltage differential can be standardised. In this way, comparison curves can be created in a resting state which make it possible to determine the angle of rotation.

According to a further aspect of the invention the actuating apparatus is adapted to actuate the switches of the bridge branches in such a way that during a second time period the second phase connection of the three phase connections is switched to passive and the first and third phase connection are alternatingly connected to the high-connection and the low-connection in a predeterminable duty cycle. During the second time period, a second induced voltage difference can be measured in the passive second phase connection. The actuating device is adapted for determining a position of the rotor and/or a commutation condition for the rotation of the motor connected to the phase connections from the ratio of the measured first induced voltage differential, the measured second voltage differential and/or the provided supply voltage.

Substantially, the function of the phases may be changed, when the rotor continues to rotate. The previously passive phase or the respective phase connection may be used as active phase and one of the previously active phases or phase connections may be used as passive phase. Thus, a detection precision may be increased, as the previously detected value of the voltage differential can be verified through an additional measurement. For example, an averaging for the determination of the voltage differential can be provided. If a second time period T2 is used in addition to a first time period T1, the length of the observation time period for the determination of the voltage difference may be extended to conduct a precise averaging with a plurality of single values.

According to a further aspect of the present invention the actuating apparatus is adapted for actuating the switches of the bridge branches in such a manner that during a third period of time the third phase connection of the three phase connections is switched to passive and the first and second phase connection are alternatingly connected to the high-connection and the low-connection in a predeterminable duty cycle. During the third period of time a third induced voltage differential is measured in the passive third phase connection. Due to the opened switches in a phase connection switched to passive substantially no current may flow. The actuating device is further adapted to determine a position of the rotor and/or a commutation condition for the rotation of the motor connected to the phase connections from the ratio of the measured first induced voltage differential, the measured second voltage differential, the measured third voltage differential and/or the provided supply voltage.

From the measured first induced voltage differential, the measured second voltage differential, the measure third voltage differential an average value for a voltage differential may be determined. Since this average value considers multiple measurements in different phased, the precision, with which the voltage differential is determined, may be increased.

According to a further aspect of the present invention at least one of the first time period, the second time period and the third time period equals exactly one cycle duration of the predeterminable duty cycle and/or at least two cycle durations of the predeterminable duty cycle.

The rotational position may be determined or detected in a defined time period, before or while a commutation process is conducted. To allow a quick determination of the voltage differential, the voltage differential ΔU can be determined already after a single switching of the active bridge branches, i.e. after the sum of the time periods S1 and S2. However, to allow a high precision, multiple cycle durations of the duty cycle can be considered. In an example all cycle durations may be considered, which are cycled up to the commutation, wherein during the commutation the passive phase may be switched. The first time period may exemplarily include all cycle durations of the alternating switching of the second and the third phase connections.

According to another aspect of the present invention the actuating device is adapted for storing the measured first induced voltage difference, the provided supply voltage, the position of the rotor and/or the commutation condition for the rotation of the motor connected to the phase conditions and/or transferring it to a commutation process.

The storage can take place for example in that a value is assigned to a variable. By storing and/or relaying a characteristic parameter for/to a commutation process, the commutation process can be adapted to the individual motor parameters of the motor which has just been connected. By means of this automatic adaptation, the same actuating apparatus can be used for various motors substantially without any manual input. It is also possible to exchange the motor without having to manually input the motor parameters in the commutation process. Thus, for example a value for a commutation condition, a voltage differential ΔU, a switching threshold $k_1$ and/or a commutation parameter determined in a start interval or a determination interval, which has been determined in a start interval by a corresponding process, can be transferred to a commutation process. For example, a first process can be suitable for a slow rotation phase of a motor, and another process can be suitable for a rapid rotation phase. By means of the variables and associated memory cells, parameters can be exchanged between the different control processes for the motor. In an example, it may be possible to use the same control method independent of the rotational speed of the motor, as exemplarily DDIS, an EMF based control method, a method for controlling the angle between stator flux and rotor flux, a 6-step commutation or FOC (Field Oriented Control). However, in another example it can also be switched between the different methods depending on the rotational speed. For allowing a soft transition during switching between the different commutation processes it can be required to replace commutation conditions in the form of different parameters. For example, a DDIS process may determine a voltage differential and/or use it as a commutation condition. Contrary to this, the FOC process may use a current vector and the 6-step commutation process with EMF may use a voltage value with dead time or a voltage integral. If exemplarily the DDIS process and the 6-step commutation process are combined with EMF, exemplarily the commutation criterion of the voltage differential ΔU has to be transformed into an angle value as commutation criterion of the 6-step commutation process, before the criterion can be transferred to the respective other process. In general, the 6-step commutation may indicate the process of switching and can be used substantially in all motor control methods. Substantially only with the FOC a 6-step-communication does not need to be included. The commutation condition is determined through DDIS and EMF or through the integral of the EMF, respectively.

According to a further aspect of the present invention the control device is adapted to switch to a predeterminable commutation process at a predeterminable rotational speed of the motor.

By measuring the passive phase, the control unit can determine the speed of a motor connected to the actuating apparatus. When this speed exceeds a minimum rotational speed required for a predeterminable commutation process, it is possible to switch to this commutation process. A commutation process which is adapted to a low speed and a commutation process which is adapted to a high speed can thus be combined. The same applies when transitioning from a high speed range to a low speed range. The DDIS process may be suitable for low speeds. However, a process which uses the EMF to determine rotary position may be very imprecise at low speeds due to the low EMF, and does not make it possible to easily determine a commutation time. At a high speed, however, the commutation time can be established efficiently by evaluating the EMF. Thus, in one example, a DDIS process can be combined with a process in which the torque as a maximization criterion is used for commutation, to exemplarily maintain an angle between stator flux and rotor flux at substantially 90°.

It should be noted that different aspects of the invention have been described with reference to different subjects. In particular, some aspects have been described with reference to device claims, whereas other aspects have been described with reference to method claims. However, from the above description and the following description, a person skilled in the art can see that, unless described otherwise, in addition to any combination of features which belongs to one category of subjects, any combination of features which relates to different categories of subjects can also be considered to be disclosed by this text. In particular, combinations of features from device claims and features from method claims are to be disclosed.

BRIEF DESCRIPTION OF THE DRAWINGS

In the following, further embodiments of the present invention will be described with reference to the drawings.

DETAILED DESCRIPTION

The drawings in the figures are schematic and not to scale. In the following description of FIG. 1 to FIG. 13, the same reference signs are used for the same or corresponding elements.

Figure 1:
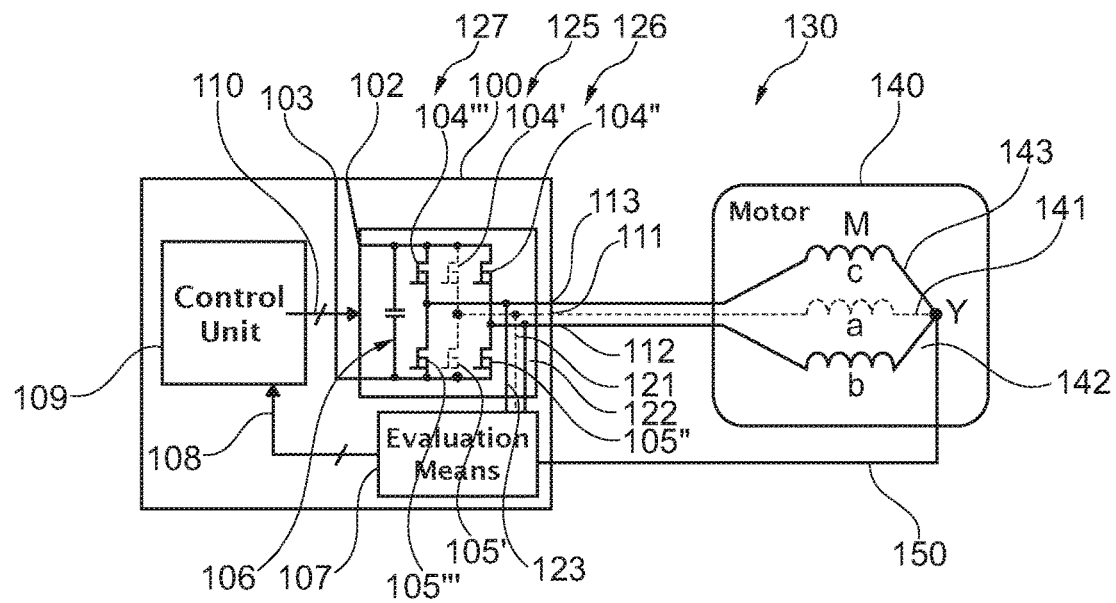
FIG. 1 is a schematic block diagram of an actuating apparatus for a motor according to an exemplary embodiment of the present invention.
Figure 2:
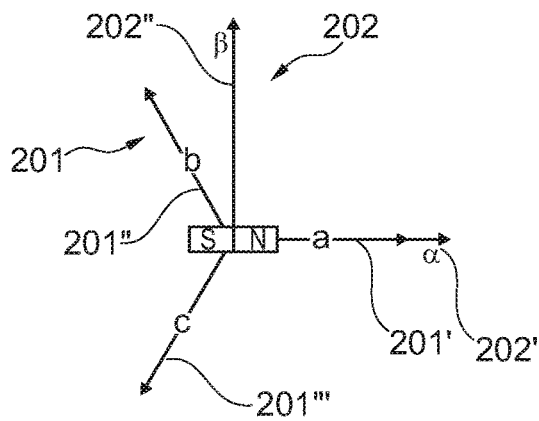
FIG. 2 shows a rotor coordinate system in relation to a stator coordinate system of an electric motor according to an exemplary embodiment of the present invention.

FIG. 1 is a schematic block diagram of an actuating apparatus 100 for a motor 140, M according to one embodiment of the present invention. The motor 140 has three phases 141, 142, 143 having corresponding phase windings a, b, c or coils a, b, c. The three phases 141, 142, 143 are interconnected at a common star point Y. The star point Y can, as indicated in FIG. 1, be brought out of the motor housing through a star line 150. However, the connector 150 is often not present. The phase connections 141, 142, 143 are connected to corresponding phase connections 111, 112, 113 of the actuating apparatus 100. The star point Y can also be reached via each of the phase connections 111, 112, 113.

The actuating apparatus 100 additionally comprises a high-connection 102 and a low-connection 103 for applying a battery voltage $U_B$ (not shown in FIG. 1). The high-connection 102 is connected to a first high-switch 104', a second high-switch 104" and a third high-switch 104'''. A connection of the high-switches 104', 104", 104''', which in each case is opposite the connection of the high-switch 104', 104", 104''', which is connected to the high-connection, is connected to in each case one of the phase connections 111, 112, 113. By means of this connection, the series circuit of the high-switch and the low-switch of each bridge branch 125, 126, 127 is produced. The first high-switch 104' is consequently connected to the first phase connection 111, the second high-switch 104" is connected to the second phase connection 112 and the third high-switch 104''' is connected to the third phase connection 113. In addition, the first high-switch 104' is connected to a first low-switch 105', the second high-switch 104" is connected to a second low-switch 105" and the third high-switch 104''' is connected to a third low-switch 105'''. At the respective connection points of the high-switch with the low-switch, also the phase connection 111, 112, 113 and a measuring connection 121, 122, 123 are connected. The three low-switches are connected to a connection 103 for the reference potential of the supply voltage $U_B$, for example a ground connection 103. In parallel with the high and/or low-switches, i.e. in parallel with the bridge branches 125, 126, 127, a capacitor 106 is arranged.

The three phase connections 111, 112, 113 are connected to three scanning connections 121, 122, 123 or three measuring connections 121, 122, 123. These lead to an evaluation means 107. The evaluation means 107 is connected to a control unit 109 by means of a connection line 108 or feedback line 108. The control unit 109 is connected to the high-switches 104', 104", 104''' and low-switches 105', 105", 105''' by means of the switching terminals 110. Each of the switches has its own physical connection 110 to the control unit. The control line 110 can alternatively be in the form of a bus so that each switch has a logical connection to the control unit 109. The control unit 109 is connected to the switches 104', 104", 104''', 105', 105", 105''' to actuate the switches of the bridge branches. The combination of high-switches 104', 104", 104''' and low-switches 105', 105", 105''' form three bridge branches 125, 126, 127 or half bridges 125, 126, 127. Each of the bridge branches 125, 126, 127 is thus connected to one of the phase connections 111, 112, 113. The switches 104', 104", 104''', 105', 105", 105''' can be produced by means of transistors or electronic switches.

The control unit 109 or the processor 109 is configured in such a way that both the high-switch of each of the bridge branches and the low-switch of each of the bridge branches can be controlled in a predeterminable sequence, the actuation taking place in such a way that one of the phase connections is switched to passive. A phase connection switched to passive means, that this phase connection is separated from the supply voltage connections 102, 103 by means of high-switch 104" and low-switch 105". Hence, also substantially no current can flow in a passive phase connection. In the example of FIG. 1 the first phase connection 111, which belongs to a phase coil a of the phase 141 of the motor 140, is switched to passive.

The scanning connection 121, which belongs to the phase 111, 141 switched to passive, can be used to measure a voltage induced into the phase coil a due to the separation from the supply voltage $U_B$. In particular a voltage can be measured at a voltage divider, which is created from both active phases b, c. It can be made access to the voltage, which is present between the star point Y and a reference potential, through a phase connection 141, 142, 143 switched to passive. When measuring a voltage over the phase switched to passive it should be take care that a current flow in the passive phase is prevented, to substantially not influence the voltage divider that develops at the star point Y. In FIG. 1 the dashed line of the phase a, 141 shows the phase connection 111 switched to passive. Both switches 104', 105' are open. Hence, the voltage at Y can be measured through the measurement line 121. The arrangement of the switches in the bridge branches allows to reverse the polarity of a voltage divider created by the active phases through setting a respective switching pattern.

Alternately, by means of the control unit 109, in each case one of the phases 141, 142, 143 or one of the phase coils a, b, c can be switched to passive. The sequence, with which the individual motor terminals are switched to active and passive during a rotation of the motor depends on the rotor position or the rotational position of the rotor of the motor M and equals the principle of the "6-step commutation" independent of the commutation method that is actually used in the case of a 3 phase motor. The 6-step commutation is a commutation method at which a BLDC motor is actuated through voltage pulses depending on the rotor position or the rotor angle that is determined during the rotation of the motor. Hereby it is taken care that the voltage pulses or voltage bursts are introduced into the active phases in such a manner that the angle between the (magnetic) flux in the stator and the (magnetic) flux in the rotor are maintained at approximately 90° to create a maximum torque for the rotor. This condition is monitored by the control device 109 during the use of the commutation method "6-step commutation" during an operation interval or a commutation interval. The principle of the "6-step commutation" can also be used with a hall sensor or another angular transmitter. This also applies to the FOC method.

The operation interval follows a start interval or a determination interval. During the start interval, the actual position of the motor is determined, while the motor is stationary or rotates only slowly. During the operation interval, the rotary position is continuously monitored through measurements of the position through the passive phase to ensure the provision of the voltage pulses at the correct time. To digitally encode the rotary position, each individual rotation is divided into two half rotations that include 180°. With this method of counting, a mechanical rotation or physical rotation equals a number of electrical rotations, which results from the number of the magnetic pole pairs (north pole and south pole). Thereby, an electrical rotation reaches from a pole of a certain polarity (north or south) to the next pole having the same polarity. For example, the poles are arranged in an alternating polarity over the rotor surface. Thus, in an example having four permanent magnets and two pole pairs an electrical rotation or a period, with which a rotation repeats, may reach from the north pole of the first pole pair through the south pole of a second pole pair up to the north pole of the first pole pair.

For the execution of the method according to the invention it does not play a role, how many pole pairs are used. The number of the used pole pairs is only relevant if the mechanical angle is of importance. In an example in all arrangements based on the Figures the motor can comprise 7 pole pairs and in the arrangement based on FIG. 12 the motor may comprise a different number of pole pairs. In another example only the motor in the arrangement based on FIG. 12 may comprise 7 pole pairs.

A half rotation of 180° can be referred to as a half electrical rotation, such that a whole physical rotation comprises two electrical half rotations. In other words, an electrical rotation reaches to a point where the same polarity as the start polarity appears at the same location. For distinguishing the both half rotations of a motor having a pole pair in the rotor a high state can be assigned with the one half of the rotation and the other half a low state. Each half of a rotation is divided into three identical angles segments or angle windows, according to the number of phases. In the example of a 3-phase motor the angle sector, that is assigned with one phase, is 180°⅓=60°. Hence, two angle segments of each 60° are assigned with each phase, i.e. a high angle segment of 60° and a low angle segment of 60°, per total rotation. Or in other words, the phases are set up in an angular offset of 60°. Through the high/low coding of the angle segments, the rotor position can be defined by a 3 Bit code. Thus, a total rotation is divided into six segments, which can be distinguished through the 3 Bit coding. After each segment a commutation is conducted, i.e. a change of the both active phases. Each segment covers an angle range of 60°. The commutation is conducted at the segment boundaries. While the rotor sweeps through a certain segment or during a commutation step always the same phases are active and/passive. During a commutation step the rotor is in a certain angle window of 60° each. Thus, with a 3-phase motor a full rotation is put together from 6 steps.

To determine the segment boundaries, a voltage differential $\Delta U$ of the voltage is induced into the passive phases at different switching times of the active phases. The voltage differential $\Delta U$ can be determined through a voltage divider arrangement of the phase windings of the active phases with a voltage measurement in the respective passive phase. A threshold value derived from the voltage differential $\Delta U$ may thus be used as an indicator or as an angle default for reaching a segment boundary and thus for switching the active and/or passive phases. The $\Delta U$ may be independent of a rotating motion. This may mean that the same $\Delta U$ for a certain angle during standstill of the motor can be measured as during a rotation.

The switches 104", 104''', 105", 105''', which belong to the active coils, are operated periodically by means of the control unit 109. Thereby, the operation is conducted in a manner that within an active bridge branch, the high-switch and the low-switch are switched in opposite directions, such that within an active bridge branch always precisely only one of the two switches is connected and produces a connection. In this way, a voltage divider can be determined from the phase windings of a motor with the aid of a second half bridge or a partner half bridge. Only in the case where a phase connection 111, 112, 113 is switched to passive both the corresponding high-switch and the corresponding low-switch are switched off, open and are not involved. Through switching back and forth of the active bridge branches, one of the both active phases are alternatingly connected to the reference potential. The voltage divider created through the half bridges and the related phases is reversed in polarity in the clock of the switching.

During the motor operation, the operation interval and a start interval or determining interval can be distinguished. The start interval substantially servers for determining the current rotary position at the standstill or during a slow rotation of the motor. In order to be able to influence the start-up of a motor M, 140, the actuation of a motor M, 140 rotating at a low speed, or the braking of a motor, the current position of the motor M and/or a motor parameter is determined by an actuation sequence of the active switches 104', 104''', 105', 105'''. For this determination, it is substantially tried to prevent a torque on the motor. For example, during the start interval and when the supply voltage $U_B$ is present on the supply voltage connections 102, 103, it is possible to control the switches of the active bridge branches 104', 104''', 105', 105''' in such a way that during a first time period T1 the first phase connection 111 is switched to passive and that during this time period the second 112 and third phase connections 113 are alternatingly connected to the high-connection 102 and the low-connection 103 in a predeterminable duty cycle. This switching sequence exemplarily ensures that the phase connection 112 is exactly always connected to the low-connection 103, if the phase connection 113 is connected to the high-connection 102 and vice versa.

Since the actuation sequence is not only usable during a standstill, but also during an operation of the actuating apparatus to determine the rotary position, the time interval, during which this actuation sequence is used, can also be referred to as injection interval. During the injection interval, an arbitrary number of phase connections of the actuating apparatus can be switched to passive sequentially.

In other words, this may mean that, whilst one of the connections 111, 112, 113 is switched to passive, a voltage is induced in said connection. In addition, the phases 141, 142, 143 are arranged in such a way that there is substantially no magnetic and/or transformer coupling between the motor phases. This may mean that a change in current in a motor phase 141, 142, 143 does not lead to a change in voltage in another motor phase by means of magnetic coupling. Only the position of the rotor relative to the stator substantially influences the magnetic flux through the phase windings and thus the impedance of the phases, which can be measured by means of the voltage differential. A rotating motor can bring about two types of induction. An EMF and a change in impedance, in particular a change in the inductance and/or inductivity. The change in voltage as a result of EMF is likewise detected in both measuring cycles and changes only insignificantly, which is why said change in voltage is zero when the differential $\Delta U$ is created. Contrary to the EMF the change in the inductance L of the DDIS method is determined and evaluated through measuring the voltage differential $\Delta U$. Since the induced voltage (EMF), which is caused by the motion of the rotor, is thus substantially avoided, the DDIS method evaluates the voltage, which is caused by changes in the impedance or induction. In order to measure the latter voltage, the bridge branches 126, 127 switched to active are excited alternatingly by means of a PWM process. This alternating excitation is achieved in that the corresponding active phase connections 112, 113 are alternatingly connected to the high-connection 102 and the low-connection, to which a DC voltage is connected. By alternatingly switching the switches on and off, the DC voltage is chopped, and in the passive phase, a voltage is induced, which is also alternating due to the distribution according to the voltage divider rule, which allows a statement about the relative position of the rotor to the stator.

In one example, the time period $T_1$, during which in the induction interval the first phase connection 111 is switched to passive and the other two phase connections are alternatingly switched to active, can correspond to a commutation period or a commutation step, i.e. the time $T_1$ until pole windings a, b, c must be switched to maintain a rotational motion. However, $T_1$ can be selected to be shorter. Since the commutation limits are predefined through angle segments, the switching time is locally fixed. Accordingly, the switching times depend on the rotational speed and are substantially identical for a constant rotational speed. After the time $T_1$ the second phase connection 112 takes over the role of the passive phase connection for a time $T_2$ and subsequently the third phase connection 113 for a time $T_3$. Also, $T_2$, $T_3$ can be chosen to have the same or a shorter length as a commutation interval. The time periods $T_1$, $T_2$, $T_3$ can have equal lengths or can differ in lengths. The sum of the time periods $T_1$, $T_2$ and $T_3$ is equal to the time for half an electrical rotation with a pole pair number of an electric motor associated with the motor M, 140, if $T_1$, $T_2$, $T_3$ are chosen to be as long as a commutation interval during a motion interval. During this time periods $T_1$, $T_2$, $T_3$ the rotor is in a certain angle window of 60° each.

During the time periods $T_1$, $T_2$, $T_3$, which lie between the switching of the passive phase connections, the respective phases, which are switched to active, are operated alternatingly. During this alternating active operation one of the high-switches 104", 104''' is closed at first and connects the associated phase connection 112, 113 with the high-connection 102. The low-switch 105", 105''', which belongs to the closed high-switch, behaves exactly inversely in relation to the high-switch of the same bridge branch and is open. The other active bridge branch behaves exactly inversely, the associated high-switch is open and the low-switch closed.

It must be pointed out that the time periods $T_1$, $T_2$, $T_3$ can also be time periods during a start interval and/or a detection interval, which can then be chosen independent of the commutation limits. In the least case the time periods $T_1$, $T_2$, $T_3$ can include only one cycle duration of a switching change of the switching states S1 and S2. During this start interval the motor may substantially not move. During a detection interval the motor may only slowly move. The start interval and/or the detection interval may be used to determine a current rotational position of the rotor. Thereby substantially no torque is created.

The duration, for which the first active high-switch is closed, is S1 and the duration, for which the second active high-switch is closed, is S2. Afterwards this process repeats periodically during the respective time period $T_1$, $T_2$, $T_3$. The cycle duration of a PWM period is S1+S2 and the duty cycle is d. In case that S1=S2 is chosen, the duty cycle is 50%. When choosing a duty cycle of d=50%, a voltage is induced in the passive phase and the related passive phase connection or generated by the voltage divider, but no torque is generated. Hence, choosing a duty cycle of 50% can be used to determine a motor parameter, without causing a rotational motion of the motor. During $S_1$ the voltage $U_1$ can be detected in the passive phase connection and during $S_2$ the voltage $U_2$ can be detected in the passive phase connection. The voltage $U_1$ is detected over the phase, which is switched to passive at first. Exemplarily in the situation illustrated in FIG. 1, the voltage $U_1$ is the voltage at the active phase c, 143, which is connected to the reference potential at first, i.e. in the state S1. The voltage $U_2$ is detected after switching into the state S2. In the state S2 the phase b, 142, is between Y node and reference potential 103. The voltage differential generally results to $\Delta U$. It is measured as the voltage differential at the low phase switched in the respective state S1, S2. Depending on in which passive phase the $\Delta U$ is determined, the voltage differential is defined as $\Delta U_a$, if it is determined in the first phase connection 111, as $\Delta U_b$, if it is determined in the second phase connection and as $\Delta U_c$ if it is determined in the third phase connection.

After executing the determination of the rotary position during the start interval and/or the detection interval it is known, which phase needs to be switched to passive and which phases need to be switched to active. These information about the rotary position can exemplarily be used in the commutation interval T4, as exemplarily shown in FIG. 11, which follows the start interval and/or the detection interval. For initiating the motion of the motor, the duty cycle between S1 and S2 is set to exceed 50%. Thereby, a medium current flows through the active phases, by what the torque is created. Since the start interval includes a very short time period in relation to a commutation interval, the start interval can be viewed in a way as if it was injected before the commutation interval. The information gained in the injection interval can be used during the commutation interval, when they are transferred to said commutation interval.

If measurements are conducted over a plurality of cycle durations S1 and S2 and/or over intervals $T_1$, $T_2$, $T_3$, the precision of the determination of the rotary position can be increased by determining mean values of the plurality of determined $\Delta U$ during these cycle durations. This measurement process for determining the $\Delta U$ can also be repeated during the commutation interval or the operation interval. For this purpose exemplarily a duty cycle d=50% can be chosen. To use the measurement process during the commutation interval, this measurement process or the actuation sequence according to DDIS can be injected into the commutation interval and/or into the operation interval. For this purpose the respective interval can be interrupted to execute the actuation sequence of the DDIS method. The interruption of a commutation method can be recognized in that exemplarily the duty cycle is changed from a value d that differs from 50% to a value of 50%.

Figure 3:
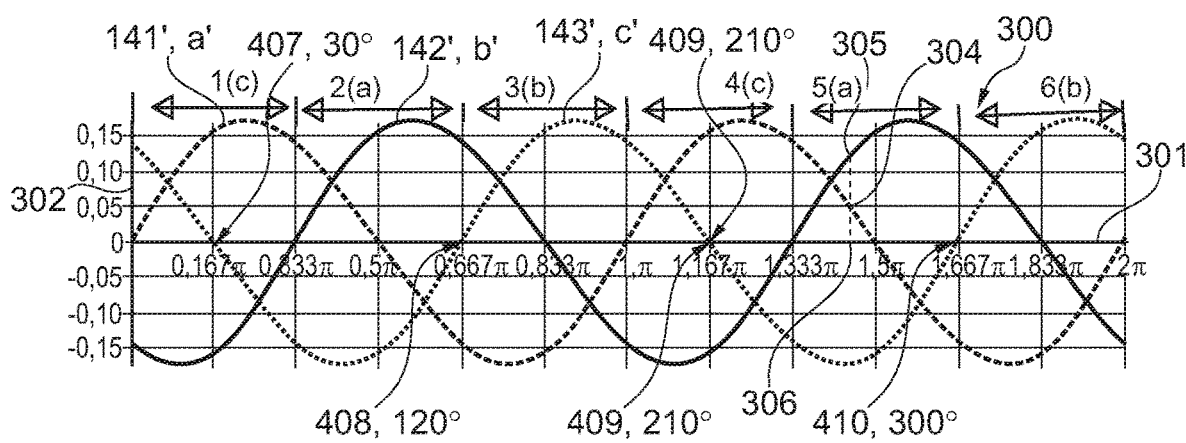
FIG. 3 shows the progression of the induced voltage differentials in the passive phase connections depending on the rotational angle according to an exemplary embodiment of the present invention.

From the determined voltage differential ΔU an angle can be determined, at which currently a rotor is located in relation to a stator of the motor M. For the clarification of an arrangement exemplarily FIG. 3 shows the rotor coordinate system 201 in relation to a stator coordinate system 202 according to an exemplary embodiment of the present invention. The rotor coordinate system 201 moves with a rotor of the motor M in relation to the stator coordinate system 202. The abscissa α, 202' and the ordinate β, 202" are arranged at a right angle relative to one another and are based on a stator of the motor M and are thus stationary. The rotor coordinate system 201 shows three vectors a, 201', b, 201" and c, 201'". The vectors correspond to the orientation of magnetic fields, which are generated by the phase windings a, 141, b, 142 and c, 143 of the motor M. The vectors 201', 201", 201'" thus correspond to a three-dimensional arrangement of the phase windings a, b, c. The phase windings a, b, c and the corresponding vectors of the magnetic fields thereof are oriented at an angle of 120° relative to one another.

For a motor M having three phases a, b, c, a six-stage commutation operation with 6 commutations ("6-step commutation") results, as explained in the text further above. The respective two active motor phases, i.e. the phases a, b, c, which are connected to the active bridge branches 125, 126, 127, are operated by using a bi-polar PWM (pulse width modulation). Due to the connection of the three phases 141, 142, 143 at the Y-node or star point it occurs that also always two phases 141, 142, 143 or phase windings a, b, c are active, if the bridge switches are respectively operated against each other. However, the other of the phases is switched to passive. During a first switching state S1, a high-switch of the one active bridge branch and a low-switch of the other active bridge branch is switched on. Thus, a current circuit from the high-connection 102, the high-switch 104" that is switched on, the phase connection 112 of the motor phase b, the Y node, the phase connection 113 of the motor phase c, the low-switch 105'" and the low-connection 103 can be created. With a substantially equal design of both active phase coils, exemplarily b and c, an inductive voltage divider is created. The Y node is on a potential of $U_B/2$ if it is presumed that the inductances and/or impedances of the coils of the phases are equal. In this case the inductance and/or the impedance and in particular the inductivity of both phase coils b, c is equal. Such a leveled inductance is referred to as "balanced inductance". Hereby it is assumed that the inductance component $L_S=L_Q-L_D$, which is created from the longitudinal inductance $L_D$ and the transversal inductance $L_Q$ and which is dependent on the rotor position, is zero.

The motor control system 130 is formed by the actuating apparatus 100 or MCU (motor control unit) 100 together with the control unit 109, the microcontroller 109 or the processor 109 and the scanning device 107 or measuring device 107 together with the motor M, 140.

A process which uses the principle of measuring inductance variance by means of ΔU is referred to in the context of this text as a DDIS process. In accordance with the direct delta inductance sensing process (DDIS), it is assumed that the angle of the rotor relative to the stator influences the inductances of the rotor coils a, b, c and of the phases a, b, c, respectively. This method is referred to as induction method or inductance method, since it can be induced in a normal motion cycle or in a normal commutation method of an electric motor. Another method may be interrupted through the induction. Depending on the design of the motor, a change of reluctance or saturation effects in the magnetic material or a combination of both effects is the cause for the effect that the inductance of the phase coils depends on the rotational angle of the motor due to a geometry of the magnetic circuit that depends on the rotor angle from a view of the respective motor phases. The inductance of the coils a, b, c is defined by the formula:

$$L_i(\varphi) = L_P + L_S \cos\left[2\varphi + \frac{2\pi}{m}(i-1)\right];$$

with the number of phases m=3 and i=1, 2, 3 according to the phase windings a, b, c Thereby $$L_P = \frac{L_Q + L_D}{2}$$

is the rotor position independent component and $$L_S = L_Q - L_D$$

The rotor position dependent component of the phase inductance.

In the case of $L_S \neq 0$, i.e. differing from the value 0, the voltage at the Y node, at the passive converter output 111, 112, 113 or at the passive phase connection 111, 112, 113 will differ from $U_B/2$. In the bi-polar PWM mode two alternating switching states S1, S2 exist. These two switching states S1, S2 multiply occur in each commutation cycle $T_1$, $T_2$, $T_3$, $T_4$, $T_5$, $T_6$, $T_7$. A commutation cycle hereby denotes the time period, for which the at least one phase is switched to passive.

The commutation cycles $T_1$, $T_2$, $T_3$ denotes intervals during a start interval and/or detection interval. In contrast the commutation cycles $T_4$, $T_5$, $T_6$, $T_7$ denote intervals during an operation interval or commutation interval.

The commutation cycle is defined by the start angle of the rotor determined in the start interval $T_1$, $T_2$, $T_3$ and/or by the determined ΔU. It is desired to switch the commutation in such a way that a switching is conducted in the instant in which the effect of a magnetic field created in the phase that is subsequently switched to active and/or the generated torque is at a maximum. Thus, a good commutation at the commutation limits can be realized without having to use a Hall sensor. Omitting the Hall sensor can lead to a reduction in weight and a simple design of the motor.

The inductance of the active phase, which is just connected to the high-connection 102 in the state S1 and thus connected to $U_B$ may be referred as $L_H$. In other words $L_H$ may be the inductance of the motor coils a, b, c, which is connected to the closed high-switch 104', 104", 104'" in the state S1. In FIG. 1 the phase b may determine the inductance $L_H$, if presumed that high-switch 104" is connected to the high-connection in the state S1 and is closed. The duty cycle d may identify the switching frequency, with which the active bridge branches are connected to the high-connection alternatingly.

LL may refer to the value of the inductance in the phase a, b, c, which is connected with the reference potential or the low-connection 103 in the state S1 through the closed low-switch 105', 105", 105'". The reference potential can exemplarily be the ground potential GND, which may be present at the connection 103. The voltage, which is present on the star point Y or at the connection of the passive phase 111 and the associated measurement connection 121, respectively, will be referred to as $U_1$. In FIG. 1 $U_1$ is determined through phase c, which is connected to low in the state S1. The phase c is the low coil $L_L$ referred to state S1.

Referred to state S1, phase b is the high coil $L_H$. During the subsequently opposite circuit during the switching state S2, the voltage $U_2$ may be measured at the measuring connection 121 and/or at the star point Y. This opposite circuit may be present if the phase b, which comprises the inductance $L_H$ when referred to the state S1, is connected to the reference potential through the switched low-switch 105" and if the phase c, which comprises the inductance LL when referred to the state S1, is connected to the high potential 102 through the high-switch 104". In FIG. 1 $U_2$ is determined across the high coil $L_H$ of the phase b connected to low in the state S2.

The voltage differential between $U_1$ and $U_2$ is ΔU or $\Delta U_a$, $\Delta U_b$, $\Delta U_c$, depending in which passive phase a, b, c or at which associated measurement input 121, 122, 123 it has been measured. ΔU is calculated by the following formula $$U_1 = \frac{L_L}{L_H + L_L} U_B$$

$$U_2 = \frac{L_H}{L_H + L_L} U_B$$

$$\Delta U = \frac{L_L - L_H}{L_H + L_L} U_B$$

Hereby the table 1 shows the commutation period $T_1$=S1+ S2, during which the phase a is switched to passive, which is indicated by an O, while the phases b and c are switched to high and low, respectively, in the switching state S1, i.e. connected to the high-connection and the low-connection, respectively. Opposite thereto, in the subsequent switching state S2, the phases b and c are switched to low and high, respectively. This switching phase lasts so long and is executed alternatingly, until at the commutation time it is switched to a new constellation for the time period T2, at which the phase b is switched to passive and at which it is switched back and forth between the two phases a and c alternatingly. After a third commutation time the phase c, 113 is switched to passive and it is switched back and forth between the phases a, 111 and b, 112 during the time period T3.

In other words, at the time S1 the terms $L_H$ and $L_L$ are defined. Thus, the coil $L_L$ is measured against the reference potential. At the time S2 the polarity of the voltage divider is reversed and the coil $L_H$, which was connected to the high potential before, is connected to the reference potential and $L_L$ is connected to the supply voltage.

TABLE 1

|   | T1 | | T2 | | T3 | |
|---|---|---|---|---|---|---|
|   | S1a | S2a | S1b | S2b | S1c | S2c |
| a | O | O | L ($L_L$) | H | H ($L_H$) | L |
| b | H ($L_H$) | L | O | O | L ($L_L$) | H |
| c | L ($L_L$) | H | H ($L_H$) | L | O | O |

FIG. 3 shows a shape of a ratio of ΔU to $U_B$ ($\Delta U/U_B$), each measured in a phase 121, 122, 123 switched to passive and in the star point Y, respectively, according to an exemplary embodiment of the present invention. In the graph, the shape of the induced voltage differentials ΔU in the passive phase connections depending on the rotational angle, in particular the electrical rotational angle, is shown. In FIG. 3 the three curves 141', a', 142', b' and 143', c' are shown. The curves correspond to a sinus-like shape and are mutually phase shifted, i.e. exemplarily with three phases about ⅓π=0.33π. The curves 141', 142', 143' were recorded in that the associated phase were switched to passive in each case and the induction and the ΔU were determined, while the rotor of the motor M was mechanically rotated. In this case, an external force was impressed, that is to say a torque was impressed mechanically. The active phases were switched alternatingly in the rhythm S1 and S2 while the rotor was rotated mechanically. The mechanical rotation is necessary because the duty cycle 50% is selected, and thus no torque is impressed by the active phases. Thus, for example the curve 141', a' corresponds to the phase a switched to passive, while the phases b and c were connected to high and low potential alternatingly. Hereby, for example a duty cycle of 50% between S1 and S2 can be used, such that no rotation would occur on its own. The angle φ of the rotor between 0 and 2π, which angle is shown in the abscissa 301 in FIG. 3, can exemplarily be caused by a manual rotation of the rotor. At the ordinate 302 the standardizes voltage differential values $\Delta U/U_B$ between −0.15 and +0.15 are shown. By this configuration the voltage differential ΔU that depends on the rotational angle can be determined depending on the rotary angle. The voltage differential ΔU is only measurable if the other two phases are actuated alternatingly to create an alternating current, which results in a voltage depending on the angle-dependent induction. The rotational position of a rotor can be determined during the operation from the determined curve and be transferred to a commutation method. Likewise, motor parameters can be determined therewith, which can be transferred to the commutation method.

The number of selected supporting points can be chosen arbitrarily. In an example, with the measuring cycle T1, T2, T3 three supporting points are determined for the curves in FIG. 3 at the same angle. With the formulas for the phase inductances and the voltages the shape of the curves 141', 142', 143' of FIG. 3 is determinable by numerical methods and/or through a table lookup. In the 3-phase case the curves are identical and are phase shifted about 120°. The 3 values determined at the same angle value can be interpreted as 3 supporting points phase-shifted about 120° of a single curve. Thus, the curves 141', 142', 143' can be constructed analytically and/or numerically under use of the formulas for the phase inductances and the voltages. For example, the method of a sine approximation of FIG. 3 can be used. Hereby the method of the least squares can be used. If the curves 141', 142', 143' are determined, also the commutation limits can be determined. In an example, these commutation limits can result as those angle values that are determined at ⅔ of the maximum peak value of the sine-shaped curve. In another example, these result at the value, which corresponds to a rotational angle of 210°. In the FIG. 3 the switching threshold ΔU and/or $k_1$ can be determined at the standardized value 0.15 and the associated angle. With a 5-phase motor it can only be acted on the assumption of a shape that is similar to a sine and the calculation of the values can accordingly be more complicated. The evaluation of the formulas and/or the table lookup can be executed by the control device 109. In an example, an approximate value of $k_1=2\Delta U/3U_B$ can be used. With this selection the commutation can always be accomplished slightly before the commutation limit; however it may that the motor still commutates.

The curve shown in FIG. 3 can be used to determine the rotor position at low speed and even at the standstill. In an example this curve can be used to determine a rotary angle during an injection interval. The determination can already be conducted during a single cycle duration of the duty cycle, i.e. after having switching back and forth between the switching states S1 and S2 exactly once. The precision of the determined angle position can be increased in that further periods of the switching states S1 and S2 are run through, while the same phase remains switched to passive, and in that a mean value of $\Delta U$ and $\Delta U/U_B$, respectively, is created from the voltage differentials per period. However, for the determination it is also possible to consider a further passive-switching of another phase during the start phase, such that for example phase a can be switched to passive, while the two switching states S1 and S2 are run through with a passive phase a, however after exactly one cycle duration S1+S2 already the next phase b is switched to passive and a further cycle period of the duty cycle is run-through.

Figure 10:
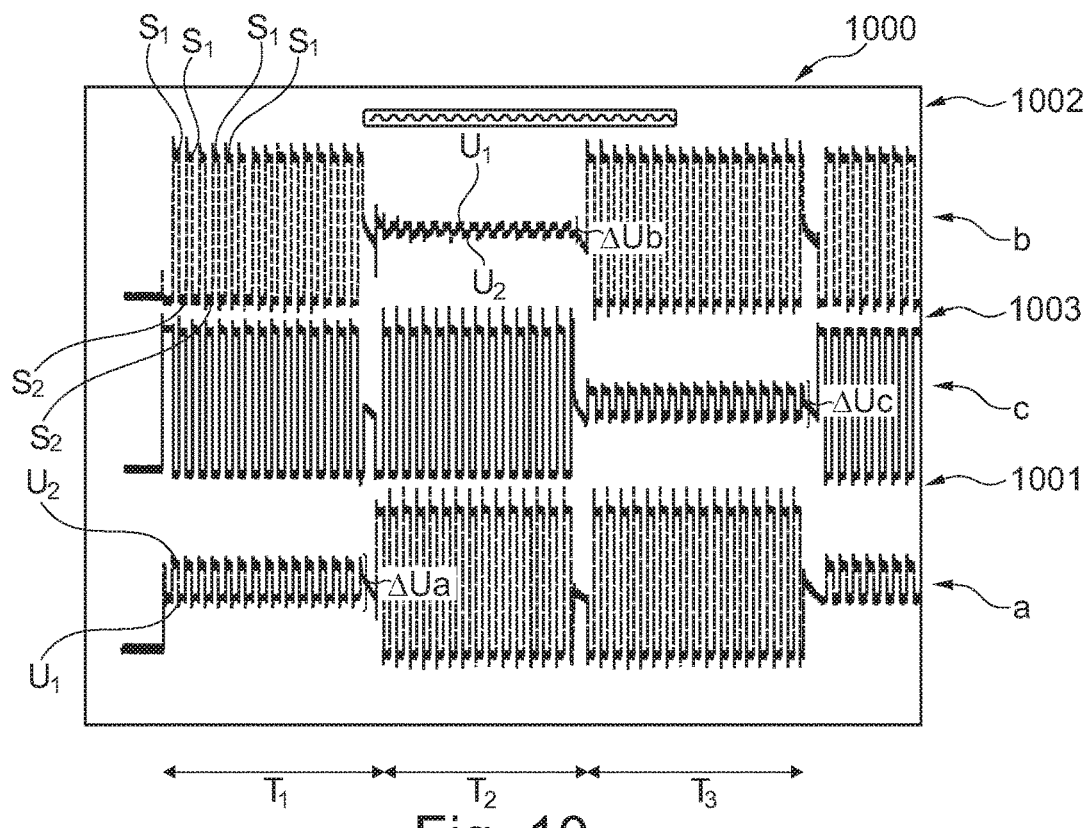
FIG. 10 shows the voltage progression on three terminals of a motor for determination of the rotor position according to an exemplary embodiment of the present invention.
Figure 11:
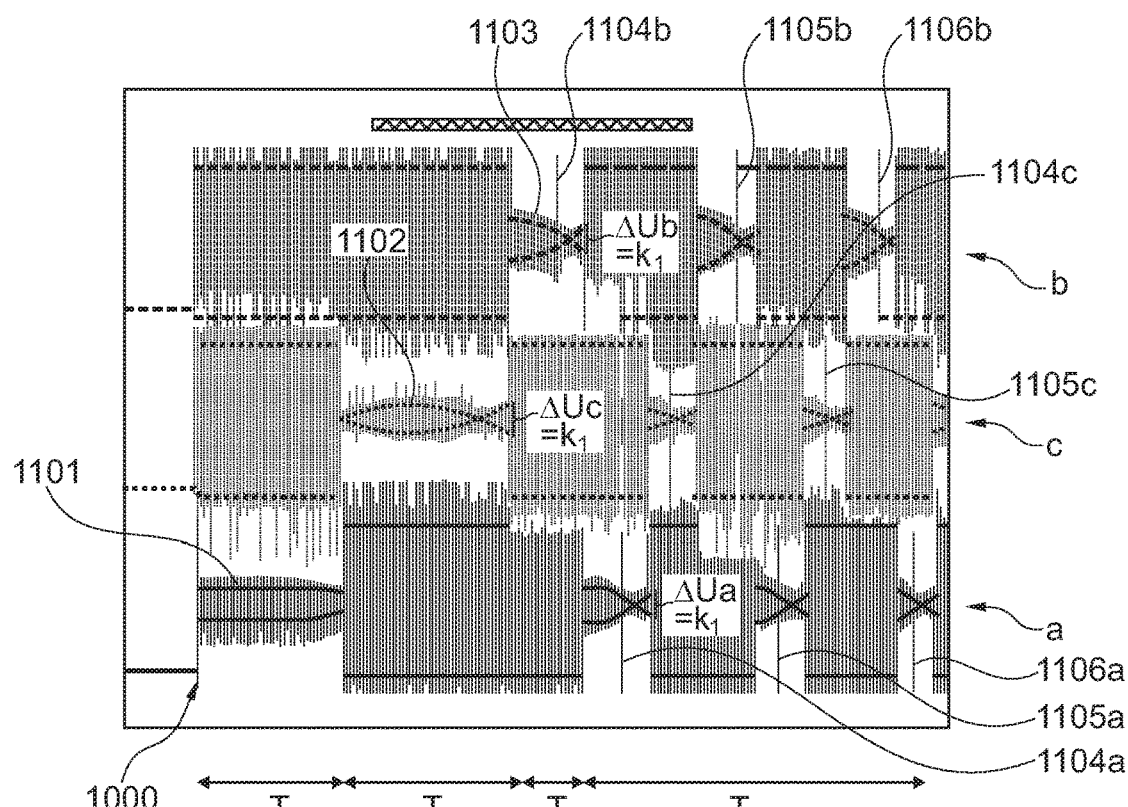
FIG. 11 shows a diagram with the time development of the voltage progressions in three phases of a motor during starting the motor from the standstill according to an exemplary embodiment of the present invention.
Figure 12:
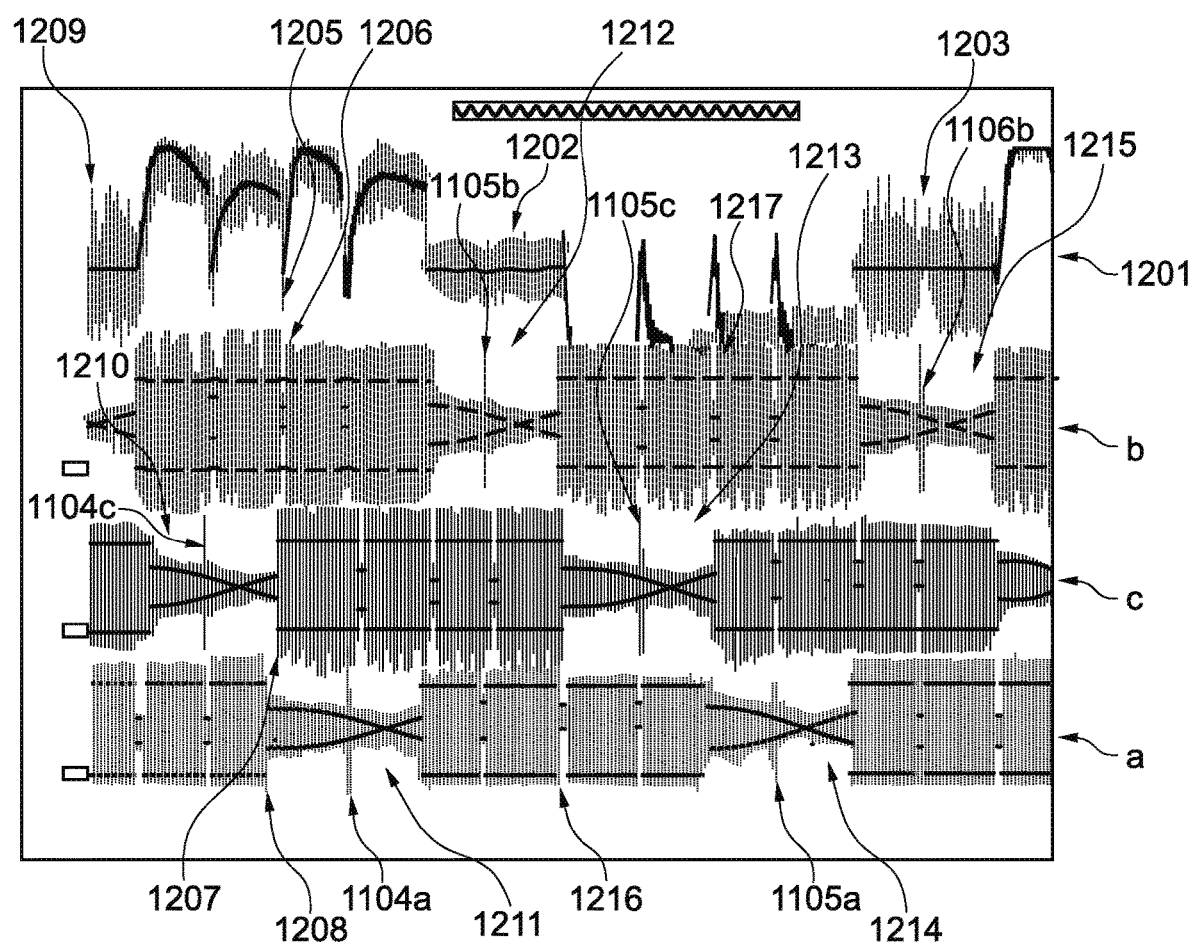
FIG. 12 shows the voltage progression on three terminals and the current progression at a terminal of a motor at low rotational speed according to an exemplary embodiment of the present invention.

This rotary position determination can be accomplished without the motor rotating. Thus, it does not need to be waited until a commutation limit is reached or until a commutation step is run-through. The rotary position determination according to the DDIS principal can be used in a start interval but also in an operation interval. In FIGS. 10 and 11 and 12 graphs for the start interval and the operation interval, respectively, are shown.

Due to the ambiguity of a single curve that is similar to a sine, an exact rotary position determination in relation to FIG. 3 may be enabled, if two different supporting points on the dimensionless or standardized ordinate 302 for $\Delta U/U_B$ on two different curves of the three curves 141', 142', 143' shown in FIG. 3 can be determined. With these at least 2 supporting points an exact determination of the rotary angle $\varphi$ is accomplishable, which rotary angle $\varphi$ is shown in the abscissa of the FIG. 3. In other words this may mean that by means of the measurements in the phase connections 111, 112, 113 and the associated measurement lines 121, 122, 123 or in the Y star point the ratio $\Delta U/U_B$ can be determined. If at least two values of the ratio $\Delta U/U_B$ for at least two different phases switched to passive are determined, with these ratios it can be jumped to a curve a', b', c' associated with the respective passive phase of the FIG. 3 and the angle value can be read from the abscissa 301. In particular the curves 141', 142', 143' are constructable.

Since a good determination precision can be achieved for the rotary position if at least two different phases are switched to passive it may be desirable to select the cycle duration S1+S2 very small. For example, during a single $T_1$, which exactly lasts one cycle duration S1+S2, and during a single $T_2$, which lasts exactly one cycle duration S1+S2, a $\Delta U_1$ and/or a $\Delta U_2$ can be determined, from which an angle value $\varphi$, 301 can be determined. Also, the associated curves 141', 142', 143' can be determined. In the case of a motor at the standstill, the motor does not rotate and the $T_1$ and $T_2$ can be selected to be long, in order to increase the precision of the angle determination. If, however, the rotary position is determined during a rotation of the motor, the motor continues to rotate between $T_1$ and $T_2$, i.e. the times, at which different phases are sequentially switched to passive in time. Thereby, the time period $T_1$ and/or $T_2$ should be selected as short as possible, for example to only a single cycle duration of S1+S2. In an example, the cycle duration S1+S2 is selected depending on the rotational speed of the motor.

In an example, during the phase a is switched to passive, a $\Delta U1/U_B$, 304 of 0.05 is determined and, during the phase b being switched to passive, $\Delta U2/U_B$, 305 of 0.13 is determined. This value combination substantially exists only once in the graph 300 and can thus unambiguously be associated with the angle $\varphi_1$, 306, which is about $1.45\pi$ In an example, it may also be possible to determine only one value for $\Delta U/U_B$. However, when evaluating the curves with this only one value ambiguities can result for the angle values due to the sine-like shape of the curves 141', 142', 143'. To prevent these ambiguities multiple support points can be chosen for the different curves. If the duty cycle is 50% and if the rotor substantially does not move, no change in the angular position between two measurements occurs, at which different phase connections 111, 112, 113 are switched to passive. In order to be able to achieve a quick access to the angle values 301, the values of the curves 300 can be stored in a memory and can be queried on demand. As an alternative, the angular position can be calculated from the determined $\Delta U/U_B$ values.

For a further increase of the precision also the third phase can be considered to determine a further voltage differential value, through which the angle 301 in FIG. 3 can be determined more uniquely.

The $\Delta U_{a,b,c}/U_B$ determined in the passive phases can be used according to FIG. 3 to determine the rotor position. From this determination of the rotor position alone it cannot be derived yet, in which direction the voltage must be adjusted, since the result of the determined rotational angle is ambiguous. For example, the direction can be determined in that a certain position is presumed and, if it is detected that the motor rotates into the other direction, the duty cycle is reversed. For example, for starting the motor now a duty cycle that differs from 50% can be selected. In an example, the duty cycle can be selected or guessed to be larger than 50%, in another example it can be selected or guessed to be smaller than 50%. The value can be guessed in that a duty cycle is chosen after a random function. With the selected duty cycle that differs from 50% it can be measured, in which direction the motor starts up in reality. If the result does not correspond to the desired direction, the duty cycle can be adjusted appropriately. If for example a duty cycle larger than 50% was presumed and if in the subsequent measurement cycle it is detected that the motor runs into the wrong direction due to this selected duty cycle, the other duty cycle can be chosen, in this example a duty cycle of smaller than 50%.

With the found $\Delta U$ and $\Delta U/U_B$, respectively, the current position of the rotor during the start phase or during the start interval can be determined and after the determination of the current position of the rotor it can be started with a permanent operation or into an operation interval of the commutation with this current position. From this position, also a commutation condition or a commutation parameter may be derived. This commutation condition may be individual for a connected motor.

In the present exemplarily embodiment the determined $\Delta U$ and $\Delta U/U_B$, respectively, is stored and transferred to a commutation method. For example, a threshold value or a commutation condition can be stored and used in the form of a variable $k_1$, in order to transfer the commutation condition determined during the start interval to the commutation method. This threshold value $k_1$ has to by exceeded by the $\Delta U/U_B$, which is continuously detected during the operation interval or during a commutation interval, to trigger a commutation process, i.e. to achieve the switching of the passive phase. The smaller this value $k_1$ is selected, the earlier the commutation is triggered. It may be desired to ensure, that it is switched as close as possible to the commutation limits or at the angle limits, which are physically predefined through the design of the motor, by means of a commutation method, which uses this threshold value $k_1$ or a value derived from $k_1$, by the selection of the threshold value $k_1$. These commutation limits may exemplarily correspond to positions, at which a motor having a Hall sensor is switched. This may mean, that it is strived for switching as close as possible at the commutation limits predefined through the motor design. The commutation condition found by the DDIS method can lead to a commutation behavior, which triggers the commutation substantially always slightly earlier as at the commutation limits. Since it is possible to switch the passive phase very precisely at the commutation limits by means of a Hall sensor, a Hall sensor can be provided at the respective commutation limits, which Hall sensor controls the commutation. However, for being able to omit the use of Hall sensors at the commutation limits and to create a substantially sensorless motor, the switching threshold or the value $k_1$ can be selected larger than it is determined, before the value $k_1$ or a value derived therefrom is transferred to a commutation method. By this increase of the determined value it can be ensured that the value $k_1$ is not selected too small to ensure an efficient operation of the motor. In an example, it may be taken care that the value for $k_1$ is only selected below a predefinable limit. The motor does not commutate anymore and remains stationary if the $k_1$ value may be selected above this limit. In an example, the limit may therefore be selected such that the motor just commutates and rotates. This limit may exemplarily be determined by the control device 109. In an example, it can be provided that a constant offset is added to the value $k_1$ determined by the DDIS method. Thereby, also this offset is to be selected such that the threshold in the region of the commutation limit is reached and that the commutation is triggered. With a threshold value $k_1$ selected too large otherwise the threshold would never be reached and a motor operated in this way would not commutate. In an example, an approximate value $k_1 = 2\Delta U / 3 U_B$ can be used. $k_1$ is a parameter characteristic for a motor, which can vary even across motors with the same design and should therefore be determined for each motor, exemplarily in a start interval, for a good commutation result.

Besides that, after a start angle or the rotary position is determined by above described DDIS method, it can be switched from the DDIS method to another commutation method, for example to a method, which can be executed without using the voltage differential and/or to a method, which omits the evaluation of $k_1$. In particular, it can be switched to the method of the 6-step commutation. In an example, it can be switched to another commutation method depending on the rotary speed, for example if a certain rotary speed is underran or exceeded. A limit for the switching to another commutation method can also be defined in such a way that the voltage induced by the rotary speed (EMF) for a measurement of the induced voltage (EMF) in the passive coil is sufficiently large to be detected and to trigger a commutation on this EMF.

An example of a method, through which the rotor position can be determined at very low rotary speeds up to a standstill is the DDIS method (Direct Delta Inductance Sensing). The DDIS method is based on the change of the inductance (self inductance) of the machine phases or of the machine coils in an alternating current circuit. The change of the inductance is determined through the voltage measurement in the voltage domain and not through a current measurement. By this, this method is very fast.

An example of a method, to which it may be switched after reaching a certain rotary speed, is the back-EMF-method, at which the induced voltage (EMF) at the terminal of the passive motor phase, caused by the motion of the rotor, is measured. It can also be switched back and forth between a method, which utilizes the self inductance of the phase coils and a method, which utilizes the EMF caused by the rotary motion, depending on the rotary speed.

A further example of a method, to which it may be switched after reaching a certain rotary speed, is the FOC (field oriented control). In the FOC all 3 half bridges 125, 126, 127 are active and are actuated e.g. through SVPWM (space vector PWM) or flat bottom PWM, and the measured phase current, which is influenced from the induced voltage (EMF) caused by the motion of the rotor, is used for the determination of the rotor position.

The curves shown in FIG. 3 can also be proven in a simulation and in a measurement curve recorded by hardware.

Figure 4:
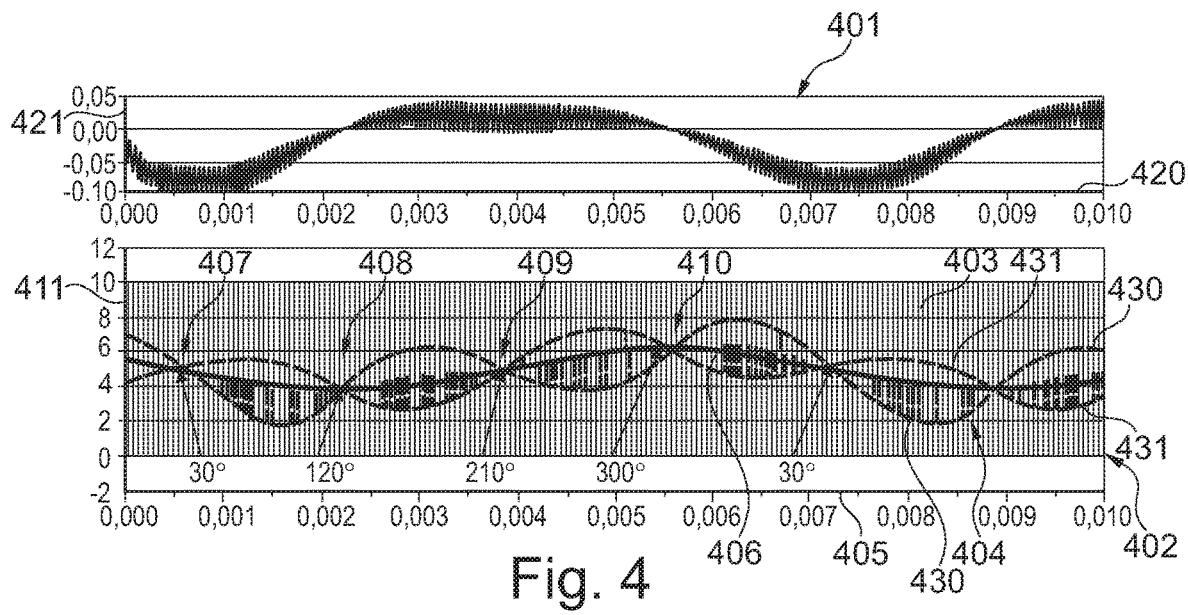
FIG. 4 shows a simulation result of the measured voltage at a motor terminal switched to passive of a motor control system according to an exemplary embodiment of the present invention.

FIG. 4 shows two curves 401, 402 of a simulation example of the measured voltage at the phase c, 113 switched to passive or the motor terminal 113 switched to passive, which curves result during the operation of a motor, according to an exemplarily embodiment of the present invention. The motor, on which the simulation is based, may be a motor with star-connected motor phases. The active motor phases are alternatingly excited by means of bipolar PWM. The motor angle progression is imposed through an exterior force or through an exterior torque. The exterior force may particularly be a manual rotation of the rotor. FIG. 4 shows the PWM signal as superposition of the induced voltage (EMF) at the passive motor phase and the voltage measurable at the passive motor terminal, caused by the self-induction. The sine-shaped progression of the zero crossings of curve 406 at 407 and 409 is caused by the EMF in the passive phase. The progression of the curves 430 and 431 similar to a sine occurs through the self-induction on the passive phase connection that depends on the rotary angle and is superposed with the EMF, such that a sine-shaped progression of the intersections at 407, 408, 409 and 410 results. The upper graph 420 shows the torque brought about by the current.

In the actuation, on which the simulation is based, an unbalanced bipolar PWM voltage pattern is presumed, at which the phase c is switched to passive and the phases a and b are alternatingly operated according to the PWM scheme of table 1. The utilization of an unbalanced PWM switching pattern means that a duty cycle d is used, which differs from 50%, through which a torque and a rotary motion are generated. The torque is to be taken from curve 401. Besides the self-induction, the rotation caused by the torque creates an EMF in the passive phase c as well as in the active phases a, b, through which it comes to a superposition of the EMF and the voltage distribution at the voltage divider caused by the self-induction.

Together with the induced voltage through the rotary motion a current flow is caused in a torque is created, as can be taken from the curve 401. It is to be pointed out that the rotation of the rotor in the model according to FIG. 4 is imposed through an exterior force and is thus independent of the control, of the torque and of the current. The torque that arises during the rotation is illustrated in the curve 401. At the abscissa 420 the time and at the ordinate 421 the created torque of an exemplarily motor are shown.

The curve 402 shows both the progression of the bipolar voltage 403 having a duty cycle, which differs from 50%, or with an unbalanced duty cycle, and the value 404 of the induced voltage values $U_1$ and $U_2$ in the passive phase c, 111, which result in the passive branch through the active branches excited by the PWM curve 403. The curve 404 is created through the superposition of the values $U_1$ and $U_2$ caused by the self-induction of the phase coils and the EMF, which is generated through rotation. The curve of the values $U_1$, which result at the time intervals S1 in the passive phase c, is exemplarily shown as upper envelope 430. The curve of the values $U_2$, which results at the time intervals S1 in the passive phase c, can be taken from the lower envelope 431. $U_1$ lies on envelope 430 and $U_2$ lies on envelope 431. Through forming the differential between the values $U_1$, the upper envelope 430 and values $U_2$ of the lower envelope 431 the progression of the voltage differential $\Delta U/U_B$ can be determined (this progression is not shown in FIG. 4). The progression of the voltage differentials corresponds to the progression of the curve 143', c' in FIG. 3, wherein in FIG. 3 no EMF is superposed due to the lack of a sufficiently fast rotation. This progression of the envelope of the values $U_1$ and the envelope of the values $U_2$ is interrupted or constricted by null points 407, 408, 409, 410. At these null points, the values for $U_1$ and $U_2$ are roughly the same, such that in the progression of the associated curve $\Delta U/U_B$ zero crossings result, as can approximately be taken from the curve 143', c' in FIG. 3. The progression of the null points 407, 408, 409, 410 similar to a sine is created through a sine-shaped offset, which is caused by the EMF. $\Delta U$ is not shown in FIG. 4, but FIG. 3, but is created from the envelopes.

Due to the rotation of the rotor having its permanent magnets, which rotation is enforced by the duty cycle differing from 50% between S1 and S2, and the EMF caused thereby, a sine-shaped induction curve 406 results, which indicates the progression of the sine-shaped voltage offset caused by the EMF. However, this voltage progression 406 is only visible in the simulation curve. It cannot be measured concurrently with the voltage progressions 430, 431 and only serves for a better understanding of FIG. 4. The EMF 406 provides the curve 430, 431 with a sine-shaped offset 406. At the angle values, which are given at the abscissa 405, zero crossings occur through the induction curve 406. These zero crossings of the voltage differential $\Delta U/U_B$ lie at 0° (0.167π), 120° (0.6677π), 210° (1.1677π) and 300° (1.667π) and are labeled with the reference numerals 407, 408, 409, 410. They periodically repeat after running through half an electrical rotation and correspond to the zero crossings of curve 143', c' of FIG. 3, which specifies the progression $\Delta U/U_B$ in the phase c. The simulation results from FIG. 4 shows that the curve progressions of FIG. 3 measured at a real machine can also be generated analytically and thus, that also the curve progressions of FIG. 3 can be utilized for a determination of the rotary angle of a real machine.

In other words, this means, that curve 430 creates the envelope for the values of the voltage $U_1$ in the switching state S1. The curve 431 creates an envelope for the values $U_2$ in the switching state S2. The voltage differential $\Delta U/U_B$ is formed from the differential of the curves 430 and 431. Due to the EMF generated by the rotation of the rotor in the phase coils, the voltages are provided with a sine-shaped offset 406. Since the active phases have opposite polarities between the switching states S1 and S2 or are connected to $U_b$ and the reference potential in opposite direction, the generated EMF acts with opposite sign and eliminates itself. Hence, the curve for the voltage differential $\Delta U/U_B$ substantially looks like the curve 141', 142', 143' of FIG. 3, which is assigned to the respective phase c, which is switched to passive. Hence, the curves for the voltage differential of FIG. 4, which, however, do not show the voltage differential $\Delta U/U_B$, but the voltages $U_1$ and $U_2$ caused by the self-induction, and of FIG. 3 can be compared, in order to determine the rotary position. In other words, the voltage differential $\Delta U/U_B$ is formed for the reason of eliminating the EMF 406, which substantially acts the same on all the coils, with opposite sign, such that a curve is generated, which corresponds to one of the curves 141', 142', 143', depending on the phase just observed.

Figure 5:
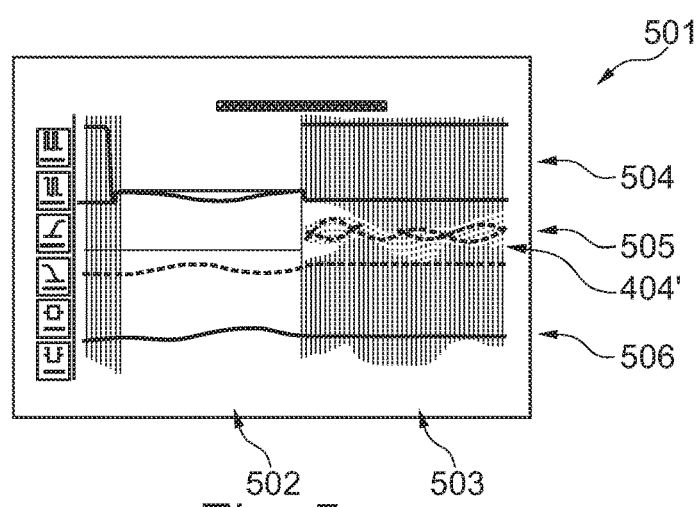
FIG. 5 shows a measurement result of a motor control system, which is operated according to the simulation arrangement that is based on the diagram of FIG. 4, according to an exemplary embodiment of the present invention.

FIG. 5 shows a measurement result of a real motor control system, which is operated according to the simulation arrangement, which is based on the graph of FIG. 4, according to an exemplary embodiment of the present invention. The graph 501 shows two regions 501, 503. Furthermore, the voltage progressions of the three phases a, 506, b, 504 and c, 505 are shown. The phase c, 505 is switched to passive. During the first time interval 502 no bipolar voltage pattern is applied. The motor is put into rotation chronologically before section 502 and thus, the permanent magnets of the rotor are moved through the inertia during the sections 502, 503. Thus, an EMF results. During the time interval 503 the bipolar, unbalanced voltage pattern is applied and the motor still rotates due to its inertia in the time interval 503. Due to this set up substantially the progression 404' results, which has already been determined in the form of curve 404 in the simulation according to FIG. 4. By this, the theoretical simulation results of FIG. 4 can be proven by a practical measurement. The bipolar PWM voltage pattern is hereby also applied to the phases a, 506 and b, 504 of the rotating machine, while the phase c, 505 is passive. In the phase c the voltage, which leads to a progression of the voltages $U_1$, $U_2$ 404', is tapped, from which the progression of a voltage differential $\Delta U/U_B$ can be derived. The progression of the curve 404' is also a combination of the induced voltage created by the EMF and the voltage distribution at the voltage divider of the active phase coils resulting from the variable self-inductance. A commutation does not take place, and during the whole time interval 503 the phase c is switched to passive, such that the whole curve progression 404' becomes apparent and not only a part, as exemplarily in FIG. 11, where the progression 404' substantially jumps from one passive phase to the other.

Figure 6:
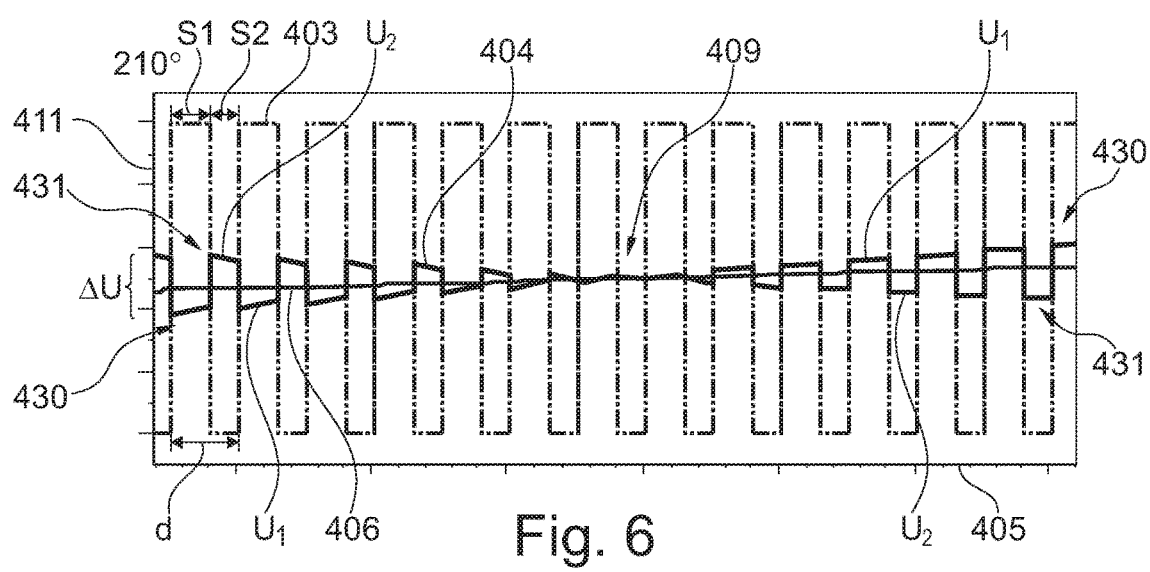
FIG. 6 shows a detail view of a zero crossing at 210° of the curve of FIG. 4 according to an exemplary embodiment of the present invention.

The null points 407, 408, 409, 410 from the simulation curve 404 are shown in the figures FIG. 6, FIG. 7, FIG. 8 and FIG. 9 in a magnification. The progression of the PWM voltage 403, which is imposed into the active phases a and b, is visible as well as the curve 404, which shows the voltage $U_1$ and $U_2$, determined in the passive phase c. The progression of the PWM voltage 403, which is imposed into the active phases a and b, can be seen, as well as the curve 404 measured in the passive phase c, which represents the voltage $U_1$ and $U_2$. The envelope of the voltage values $U_1$ is the curve 430, the envelope of the voltage values $U_2$ is the curve 431. At the abscissa 405 the simulation time is shown, while at the ordinate 411 the absolute voltage value in relation to GND is shown. $\Delta U$ is recognized as differential between $U_1$ and $U_2$, which creates a standardized voltage differential value relative to $U_b$. In the direction of rising simulation time or rising angle value, $\Delta U$ decreases in the region of the zero crossing 409 and increases in the direction of further rising time values or angle values. Thus, also the progression $\Delta U$ has a zero crossing at the null points 407, 408, 409, 410, as can be derived from the graph 143', c'. FIG. 6 shows the zero crossing 409 at 210°. Furthermore, it can be recognized that the switching state S1 lasts longer than the switching state S2, which corresponds to an unbalanced duty cycle d or a duty cycle different from 50%, which serves for a torque.

Figure 7:
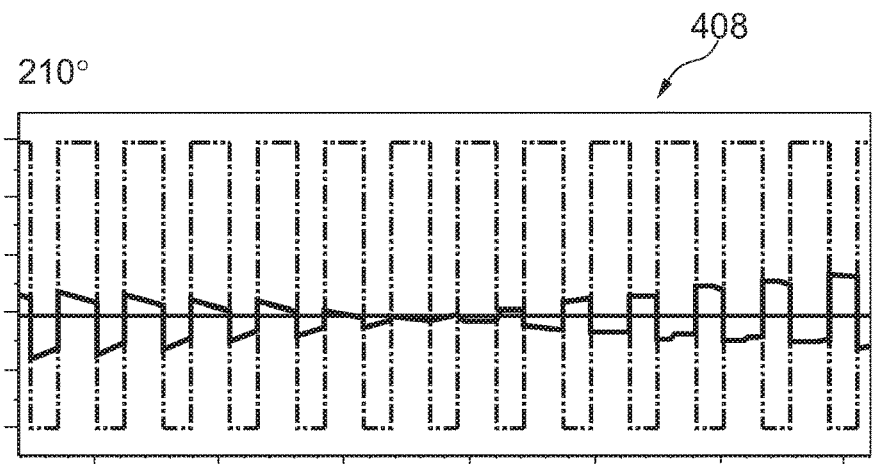
FIG. 7 shows a detail view of a zero crossing at 120° of the curve of FIG. 4 according to an exemplary embodiment of the present invention.
Figure 8:
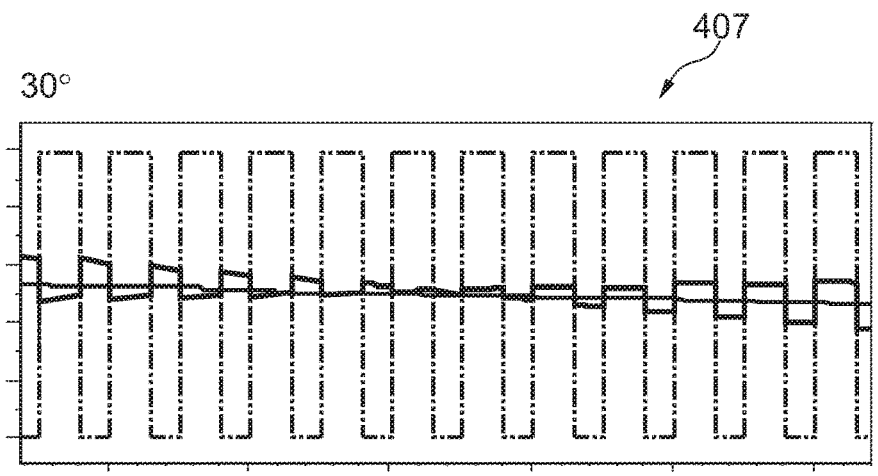
FIG. 8 shows a detail view of a zero crossing at 30° of the curve of FIG. 4 according to an exemplary embodiment of the present invention.
Figure 9:
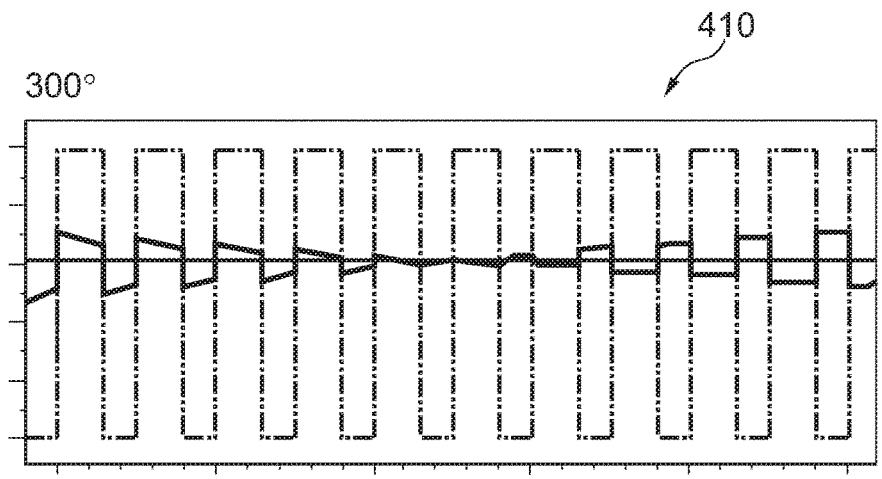
FIG. 9 shows a detail view of a zero crossing at 300° of the curve of FIG. 4 according to an exemplary embodiment of the present invention.

FIG. 7 shows a section around the zero crossing 408 at 120°. FIG. 8 shows the zero crossing 407 at 30° and FIG. 9 shows a zero crossing in the region 410, i.e. at 300°.

The zero crossings at 30°, 120°, 210° and 300° can reliably be detected and are connected with a certain rotor position in each case. However, substantially the zero crossing at 210°, 409 is interesting, and the zero crossing at 30°, 407, respectively, since here a maximum of torque 401 according to amount is present. If the motor is operated by the method of the 6-step-commutation these angles correspond to the zero crossings, which appear at the passive motor terminal c or at the phase connection 113, c switched to passive. These zero crossings can be utilized in the practical operation for a determination of the rotor position. In the simulation example according to FIGS. 4, 6, 7, 8, 9 the motor is actuated by a PWM duty cycle d, which together with the supply voltage $U_b$ leads to a voltage at the motor terminals that is higher due to self-induction, then the voltage induced through the rotational speed (EMF). Accordingly, in the region around 210° a positive current through the active phase connections a and b arises, which leads to a driving torque. This can be recognized in curve 420 in the region of approximately 0.003 to 0.0045 as a positive torque with about 0.02 Nm. In the region around 30° the induced voltage caused by the rotational speed (EMF) has the same polarity as the modulated voltage resulting in the passive phase through the imposed PWM signal, and a greater, breaking torque is created. This can be recognized in the region 0.000 to 0.001 of the curve 420, having a size of −0.08 Nm. The maximum differential value or the maximum delta value of the voltage ΔU can exemplarily be reached between 210° and 300°. This maximum differential value of the voltage may be difficult to determine or be variable. It is considered to adjust the commutation time in proximity to that maximum of ΔU and at a positive torque 401 to commutate in the region of the positive torque. Hence, in an example it may be commutated at an angle of 210° or at an angle in the region 210°–30° to 210°+30°.

In FIG. 3 the axis of 301 is the electric rotor angle. With this axis the commutation angles lie at: 0, 0.333π, 0.667 π, π, 1.333 π, 1.667 π, 2 π, i.e. in a distance of 60°. In FIG. 3 the commutation sequence referred to FIG. 10 is given. The commutation sequence of the 6-step-commutation is 1(c), 2(a), 3(b), 4(c), 5(a), 6(b). The number indicates the commutation step number and the letter identifies the passive phase. At the sequence limits the commutation limits are recognizable, which substantially lie at the intersections of the curves with the value 0.15.

If the commutation angle for a passive phase is found, for example the passive phase c, the commutation angles of both other passive phases are phase-shifted about 60° and 120°, respectively, about this found angle. Hence, as the commutation is triggered by the ΔU value determined before and the $k_1$-value, respectively, i.e. the voltage differential between two preceding sampling times of the PWM that is always smaller than the maximum of ΔU, the commutation in the 6-step commutation method, which uses the ΔU as indicator for the commutation, i.e. the 6-step commutation method, which uses DDIS, appears to be always too early.

In other words, it is waited until the maximum of ΔU is found. However, the ΔU can only be determined from the differential $U_1-U_2$. However, $U_1$ and $U_2$ do not appear at the same time due to the duty cycle between S1 and S2. In the instant, in which a maximum ΔU is detected, the maximum ΔU in reality has already passed. As can be derived from the envelopes 430 and 431 in FIG. 4, ΔU decreases after a maximum. The shift between $U_1$ and $U_2$ can exemplarily be taken from FIG. 6. This shift results from the duty cycle, which is selected between S1 and S2.

Another commutation method, for example FOC, would use an angle as criterion. For this, the ΔU would be transformed into a commutation angle, before the criterion is transferred to the commutation method. At least, in a commutation method, which utilizes the voltage differential in a passive phase as commutation criterion, the switching is earlier than it is defined through the commutation limits in a 6-step commutation method. However, this too early commutation can be tolerated and may only lead to a slightly reduced mean torque. The reduction of the torque in comparison to the exact switching on the commutation limits may substantially not be recognizable. However, in an example the early commutation can exemplarily be compensated in that the control device 109 provides an offset, which compensates the switching that is too early. The control device 109 can arrange for a later commutation in that the commutation is delayed, to switch at the correct commutation angle and to switch as near as possible at the commutation limits. To allow for a switching at the commutation limits in an example a Hall sensor may be provided, which takes care of the commutation from a certain rotational speed on. The sensors can be mounted at the stator. For positioning either the magnetic field of the permanent magnets can be measured or a distinct pole wheel can be used. By the additional provision of Hall sensors the DDIS method can serve for a quick start up of a motor and the hall sensor can take care of the commutation at the commutation limits from a predeterminable rotary speed on. As an alternative, also an induced EMF in a passive phase can serve for the commutation at the commutation limits from a certain minimum rotary speed upwards. This commutation angle can exemplarily a lie in the region of 210°.

A commutation is conducted if it is detected that the threshold value $k_1$ created from the voltage differential ΔU is exceeded. However, it is also possible that e.g. with a very slowly rotating motor shortly after a commutation the orientation of rotation changes, if an exterior force rotates the motor into the opposite direction. Such a change of direction can be detected only very imprecisely when observing the ΔU at the passive phase connection alone.

In an example, when utilizing the DDIS method a good detection of the rotary direction can be achieved, if an additional commutation cycle is "injected" in a timely proximity of a zero crossing 409 when driving or 407 of the curve 404, 404'. In other words, even if the current voltage differential ΔU is distanced from the threshold value $k_1$ for a commutation limit, still momentary at least a passive phase is switched and thus an artificial commutation is introduced. This additional commutation cycle serves for an additional rotary position measurement, to detect whether the rotary direction has changed in the meantime. In other words, during an operation interval a start interval having a duty cycle d=50% is introduced, in which momentary at least a passive phase is switched. The duty cycle can be 50% during this very short interval. In another example, the duty cycle may be defined to differ from 50%. For increasing the measurement precision with the injected, additional rotor position measurement, both phases that are just active can be commutated for a short time and thereby be switched to passive, to determine the current rotor position with the aid of the curve 141', a', 142', b', 143', c' of FIG. 3 associated with the respective passive phase or a corresponding table. Such an injection of a start interval during an operation interval can exemplarily be recognized in FIG. 11 with the injection intervals 1104b, 1105b, 1106b, 1104c, 1105c, 1104a, 1105a, 1106a. This switching of the passive phase may be conducted before a zero crossing. This operation mode is used at small rotary speeds, at which a change of the rotation direction is estimated within a commutation cycle.

However, also directly after a measurement cycle 1104b, 1105b, 1106b, 1104c, 1105c, 1104a, 1105a, 1106a and 409 at a zero crossing, respectively, i.e. after injecting a measurement phase at a zero crossing, a change in the rotation direction can occur. For this reason, not only at the zero crossings an injection interval is inserted, but in another example an injection interval, i.e. a further commutation or measurement cycle, is also introduced before each commutation. These additional injections phases are exemplarily recognizable in FIG. 12 at the commutation times 1206, 1207, 1208 or at the commutation positions 1206, 1207, 1208, at which the current 1201 in the passive phase b reaches zero, as exemplarily shown at the position 1205. At this time, at which the transition from the passive phase c to the passive phase a happens, the phase b is switched to passive for a short time. In other words, at the time 1207 it is switched from the passive phase c to the passive phase a. However, before phase a is switched to passive, the active phase b is also switched to passive for short time, as can be seen at the position 1206.

Contrary to injections, which are conducted at zero crossings 1104b, 1105b, 1106b, 1104c, 1105c, 1104a, 1105a, 1106a and 409, respectively, and with which in each case two active phases are subsequently switched to passive for a short time for increasing the determination precision, in injection phases at the commutation limits 1207 only a single active phase b, 1206 is switched to passive for a short time, since the other active phase a is switched to passive in the subsequent commutation interval 1211 anyway. Hence, with an injection at the commutation limits, less active phases are switched to passive than with an injection at a null point, at which the position must be determined with a high precision. Since the injection at null points can also be accomplished with only a single passive switching of an active phase, in an example the number of phases switched to passive may be selected to be the same with both injections. The injections at the null points 1104a, 1104c, 1105b are also illustrated in FIG. 12.

During the interval 1209 the phase b is switched to passive, as can be recognized from the current 1201 through the phase b decreasing to zero. During the interval 1210 the phase c is switched to passive except for the injection 1206 at the commutation limit and the injection 1104c at the null point. During the interval 1211 the phase a is switched to passive except for the injection 1208 at the commutation limit and the injection 1104a at the null point. During the interval 1212 the phase b is switched to passive except for the injection at the commutation limit 1216 and the injection 1105b at the null point. During the interval 1213 the phase c is switched to passive, except for the injection 1105c at the null point and the injection 1217 at the commutation limit. This sequence of commutating, switching to passive, injection at the null point and injection at the commutation limit periodically repeats as long as the motor rotates.

In FIG. 12 the current through the phase b is detected by means of a current sensor. This current only serves for clarification of the current flow in a phase, but will not be evaluated during an operation in reality.

In another example the use of a motor having more than three phases and a respective actuating apparatus having more than three phase connections, exemplarily a five phase machine having ten commutation steps, can contribute to an increase in the precision of the determination of the commutation additionally or as an alternative. Machines, which have a higher number of phases, for example five-phase motors or seven-phase motors as well as eleven-phase motors, with 10-, 14- or even 22-step commutations, can still increase the precision of sensing the rotary angle of the rotor relative to the stator.

In FIG. 10 a start phase for a stationary motor or the motion phase for a very slowly rotating, but definitely inactive motor is shown. An inactive motor may not produce a torque. During this start phase or during the start interval, which is shown in graph 1000, the determination of the rotor position is accomplished in three steps. Each step may correspond to a phase switched to passive.

However, also two steps or only a single step could be sufficient to conduct a sufficiently precise position determination. In the three-step method the phases a, b and c are switched to passive sequentially and subsequently during standstill of the motor, while the active phases are actuated with at least one period S1 and S2. Thereby, the switching time periods T1, T2, T3 can be selected independently from the commutation angles, since the rotor of the motor does not rotate and thus does not need to be commutated, or in the case of an induction interval 1104b, 1105b, 1106b, 1104c, 1105c, 1104a, 1105a, 1106a, because of the rotor continues to rotate due to the inertia anyway.

The three graphs 1001, 1002, 1003 for the three phases a, b, c in FIG. 10 also show the angle measurement cycles 1104b, 1105b, 1106b, 1104c, 1105c, 1104a, 1105a, 1106a under use of the injected commutation at the respective zero crossing or before conducting a commutation. In this exemplarily embodiment a duty cycle of 0.5 is used. In other words, the sequence shown in FIG. 10 can be interpreted as an injection sequence. Depending on whether the injection is conducted at a null point and/or at a commutation limit, a single, two and/or three phases may be switched to passive. In another example the number of phases, which are switched to passive during an injection interval, may depend on the precision, with which the rotary position of the rotor can be sensed.

During the first time period $T_1$ in FIG. 10 the active phase connections b and c are subsequently connected to high and low and/or they are switched back and forth between the high and low. The state high can correspond to the supply voltage $U_b$ and the State low can correspond to the reference potential. The switching impulses and or switching states are indicated with S1 and S2. The phase a is switched to passive during $T_1$ and a first $\Delta U_a$ can be determined. Since the motor substantially does not move and/or only moves slowly due to a duty cycle of 50%, the $\Delta U_a$ remains substantially constant over $T_1$. After the time $T_1$, which in the shortest case can include substantially only one change between S1 and S2, the phase b is switched to passive for the time $T_2$ and the supply voltage is alternatingly switched back and forth between phases a and c. In the passive phase b the voltage differential $\Delta U_b$ can be determined between the voltage values $U_1$ and $U_2$. In a third interval $T_3$ the phase c is switched to passive and it is switched back and forth between both phases a and b periodically, such that in phase c a third voltage differential $\Delta U_c$ results. The border of the steps, in which the phases a, b and c are run through, may arbitrarily be selected. In the described case the start interval includes the time periods T1+T2+T3. However, it can also include exactly one time period $T_1$, $T_2$, $T_3$ or exactly two time periods $T_1$, $T_2$, $T_3$. The bigger the number of the evaluated cycle durations is, the better the rotary position and/or the curve 141', 142', 143' can be determined. The start interval may also be injected during a rotation phase, an operating interval or a commutation phase of the motor. Hence, the start interval can also be referred to as injection interval.

The rotary position sensing during the start phase 1000 or during the start interval 1000 is conducted in a very short time, as shown in FIG. 11.

FIG. 11 shows the operation, an operation interval or a commutation interval that follows the start phase 1000, in which at first the phase a is switched to passive for the time $T_4$, while the active phases c and b are operated alternatingly. The passive phase can be recognized by the pattern 1101, 1102, 1103 of the absolute voltage progression, which is known from FIG. 4, 404 and FIG. 5, 404', is created, which is not constantly $\Delta U_a$, $\Delta U_b$, $\Delta U_c$, like in FIG. 10, but comprises zero crossings due to the rotation of the rotor and the coaction of EMF and self-induction. From the progression of the absolute voltages 1101, 1102, 1103 the respective voltage differential $\Delta U$, $\Delta U_a$, $\Delta U_b$, $\Delta U_c$ can be read.

In the time $T_5$ the phase c is switched to passive and in the time $T_6$ the phase b is switched to passive. The respective active phases are switched back and forth bipolarly through PWM and the pattern 1101, 1102 and 1103 shown in FIG. 11 results in the respective passive phases. From $T_6$ on, in the region of the time $T_7$, the passive-switching of the respective phases periodically repeats, according to the rotational speed and the $k_1$ value that is defined during the start interval as a switching time, which $k_1$ value substantially corresponds to a value of a voltage differential $\Delta U$. The switching threshold $k_1$ may be substantially the same for all phases, as the associated curve progressions substantially only differ by a phase shift. A commutation based on the $k_1$ value may substantially be conducted slightly before a commutation limit. However, the commutation can also be delayed in time by providing a delay and/or an offset, such that it is switched substantially exactly at the commutation limit, which is defined through the arrangement of the phases. As can be seen in FIG. 11, a commutation is conducted between the individual regions $T_4$, $T_5$, $T_6$.

While the commutation in the start phase 1000 or the start interval 1000 of FIG. 10 or in a slow operation phase 1000 according to FIG. 10, as shown in graph 1000, is not linked with a rotation and commutation, it is recognizable that the distances between the commutation due to different rotational speeds during the time progression shown in the time intervals $T_4$ to $T_7$ can change. This change of distances of the commutation times is caused by reaching a commutation limit faster, if the motor rotates with a higher rotational speed and thus if the angular velocity increases, while the commutation limits remain unchanged.

During the start interval 1000 a $\Delta U$ is determined, from which the threshold value $k_1$ is determined. This will be utilized for triggering a commutation at the interval limits $T_4$, $T_5$, $T_6$, when the actual $\Delta U$ exceeds the threshold value $k_1$. The threshold value $k_1$ may be increased about a factor for not switching too early and/or after reaching the threshold value $k_1$ it is only switched after a fixedly predefinable delay.

If the motor has rotated once after having been turned on, and if it has been operated since this time with the described DDIS method, the method ensures that the motor substantially always commutates reliably even at low speed and/or at the standstill or also at a change in direction in proximity to the commutation limits.

During an operation interval $T_4$, $T_5$, $T_6$ injection intervals 1104b, 1105b, 1106b, 1104c, 1105c, 1104a, 1105a, 1106a can be provided in the proximity to zero crossings of the voltages caused in the passive phases, in order to increase the precision of the commutation. These injection intervals 1104b, 1105b, 1106b, 1104c, 1105c, 1104a, 1105a, 1106a are composed similarly to the sequence that is executed during the start interval 1000, wherein substantially only those two phases that are active during an operation interval are switched to passive for a short time.

For example in the operation interval $T_6$ phase b is that phase that is just switched to passive, while the phases a and c are switched to active. The pattern of the progression of the induced voltage 1103, which results from the EMF caused by the rotation and the voltage distribution at the voltage divider of the passive phase due to the angle-dependent self-induction, is interrupted in the region of a zero crossing through the insertion of an injection phase, to be able to detect a possible reversal of the rotational direction. Since in the case of the pattern 1103 the phase b is the passive phase, the phases a and c are switched to passive for a short time during the injection interval 1104b, similar to the illustration in FIG. 10 for the start interval. The commutation at the limit $T_6$, $T_7$ is conducted, when the $\Delta U/U_B$ derived from the voltage progression 1103 of the associated voltage differential progression exceeds the threshold $k_1$, which is determined in a start interval ($k_1 = \Delta U/U_B$). The induction interval 1104b, 1105b, 1106b, 1104c, 1105c, 1104a, 1105a, 1106a can also be utilized for checking, whether the threshold value $k_1$ is still valid and for optionally correcting $k_1$.

FIG. 12 shows the operation interval according to FIG. 11 with another motor, according to an exemplary embodiment of the present invention. In this measurement arrangement additionally a current sensor is arranged in one of the motor phases a, b, c, which current sensor additionally to the voltage differential $\Delta U$ measures the current through a phase, as distinguished from the motor, on which the graphs of FIGS. 10 and 11 are based. This current sensor allows to present the current progression 1201 in a passive phase b parallel to the voltage progression in the phases. The graph 1201 shows the current progression 1201 measured in the phase through the additional current sensor. The current is zero 1209, 1202, 1203 in each case, if the phase connection b is switched to passive. The decrease of the current to the value zero is the case in two 1202, 1203 of six commutation cycles 1210, 1211, 1212, 1213, 1214, 1215 or due to the rotary position measurement at the zero crossings 1104a, 1104c, 1105a, 1105b, 1105c, 1106b in the time regions with the phase connection b switched to passive, as can be taken from the sections 1202, 1203, 1209 of the current curve 1201.

Figure 13:
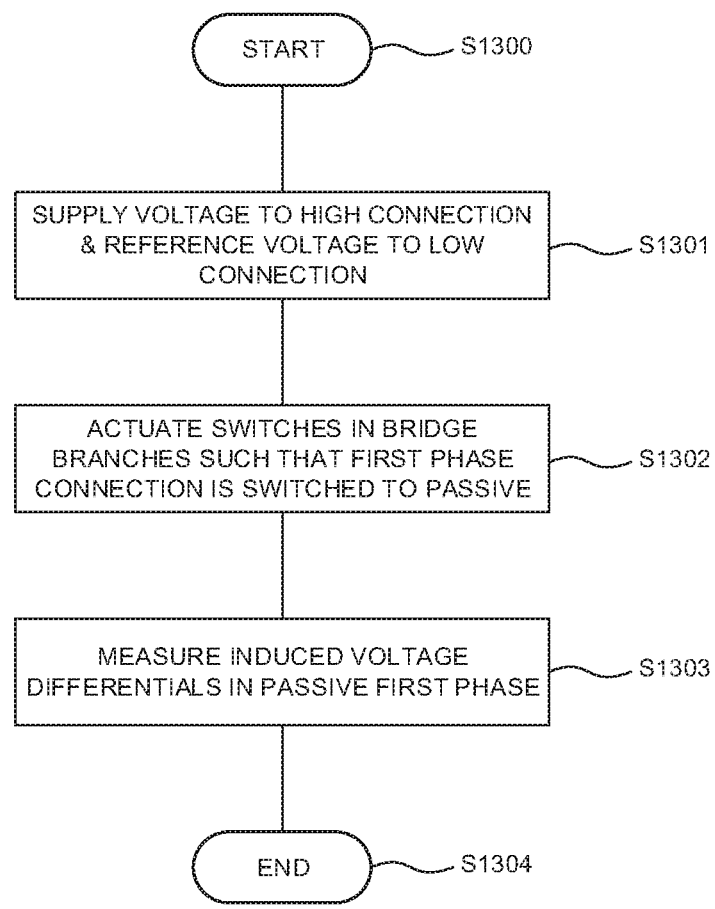
FIG. 13 shows a flow chart for a method for actuating a motor according to an exemplary embodiment of the present invention.

FIG. 13 shows a flow chart for a method for actuating a motor according to an exemplary embodiment of the present invention. The method for actuating a motor starts in a start state S1300. In a step S1301 a supply voltage $U_B$ is supplied to a high-connection 102 and a reference potential of the supply voltage $U_B$ is applied to a low-connection 103 of a bridge circuit having at least three bridge branches 125, 126, 127, each having a series connection of a high-switch 104', 104", 104''' and a low-switch 105', 105", 105'''. The high-switch 104', 104", 104''' of each of the bridge branches 125, 126, 127 is connected to the high-connection 102. The low-switch 105', 105", 105''' of each of the bridge branches 125, 126, 127 is connected to the low-connection 103.

Furthermore each of the at least three bridge branches 125, 126, 127 between the high-switch and the low-switch 105', 105", 105''' of the respective bridge branch is connected with one phase connection 111, 112, 113.

In a further step S1302 an actuation of the switches in the bridge branches is conducted in a way that during a first time period $T_1$, $T_2$, $T_3$ a first phase connection 111 of the three phase connections 111, 112, 113 is switched to passive and the second and third phase connection 111, 112, 113 are alternatingly connected to the high-connection 102 and the low-connection 103 in a predeterminable duty cycle S1, S2.

In a step S1303 the measuring of a first induced voltage differential $\Delta U_a$, $\Delta U_b$, $\Delta U_c$ in the passive first phase connection 111 during the first time period $T_1$, $T_2$, $T_3$ is conducted. This induced voltage differential $\Delta U_a$, $\Delta U_b$, $\Delta U_c$ is generated based on the angle-dependent self-inductance of the phase windings. After determining the voltage differential, a threshold value $k_1$ as a commutation condition can be determined. This commutation condition can be provided to a subsequent commutation method, in order to commutate in the right moment. As an alternative, it can also be switched to a commutation method, which does not evaluate toe voltage differential $\Delta U$, from the point of reaching a predeterminable rotary speed on.

The method ends in the end state S 1304 and the determined commutation condition can be provided to the other commutation method or the same (DDIS) commutation method.

In addition, it should be noted that the terms "comprising" and "having" do not exclude any other elements or steps and "a" or "one" does not exclude a plurality. Furthermore, it should be noted that features or steps which have been described with reference to one of the above embodiments, can also be used in combination with other features or steps of other above-described embodiments. Reference numerals in the claims should not be understood as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuating apparatus for a motor, comprising:
   at least three phase connections for connection with a respective phase of the motor;
   a high-connection for applying of a supply voltage;
   a low-connection for applying of a reference potential of the supply voltage;
   at least three bridge branches having a series connection of a high-switch and a low-switch in each case;
   a control device for actuating the switches of the bridge branches;
   wherein the high-switch of each one of the bridge branches is connected to the high-connection;
   wherein the low-switch of each one of the bridge branches is connected to the low-connection;
   wherein each of the at least three phase connections is connected to exactly one of the at least three bridge branches between the high-switch and the low-switch of the respective bridge branch;
   wherein the control device is configured for actuating the switches of the bridge branches in such a manner that during a first time period a first phase connection of the three phase connections is switched to passive and the second phase connection and third phase connection are alternatingly connected to the high-connection and the low-connection in a predetermined duty cycle if the supply voltage is applied,
   wherein the control device is configured for measuring a first induced voltage differential in the passive first phase connection during the first time period, and
   wherein the first induced voltage differential is created from voltages induced by alternatingly connecting the second phase connection and the third phase connection to the high-connection and the low-connection in the predetermined duty cycle.

2. The actuating apparatus according to claim 1, wherein the control device is configured for determining the position of the rotor and/or a commutation condition for the rotation of motor connected to the phase connections, based on the ratio of the measured first induced voltage differential and the applied supply voltage.

3. The actuating apparatus according to claim 1, wherein the actuating apparatus is configured for actuating the switches of the bridge branches in such a manner, that during a second time period the second phase connection of the three phase connections is switched to passive and that the first phase connection and the third phase connection are alternatingly connected to the high-connection and the low-connection in a predeterminable duty cycle; and
   for measuring a second induced voltage differential during the second time period in the passive second phase connection;
   wherein the control device is configured for determining a position of the rotor and/or a commutation condition for the rotation of the motor connected to the phase connections based on the ratio of the measured first induced voltage differential, the measured second voltage differential and the applied supply voltage.

4. The actuating apparatus according to claim 1, wherein the actuating apparatus is configured for actuating the switches of the bridge branches in such a manner, that during a third time period the third phase connection of the three phase connections is switched to passive and that the first phase connection and the second phase connection are alternatingly connected to the high-connection and the low-connection in a predeterminable duty cycle; and
   for measuring a third induced voltage differential during the third time period in the passive third phase connection;
   wherein the control device is configured for determining a position of the rotor and/or a commutation condition for the rotation of the motor connected to the phase connections based on the ratio of the measured first induced voltage differential, the measured second voltage differential, the measured third voltage differential and the applied supply voltage.

5. The actuating apparatus according to claim 1, wherein at least one of the first time period, the second time period and the third time period corresponds to exactly one cycle duration of the predeterminable duty cycle and/or at least two cycle durations of the predeterminable duty cycle.

6. The actuating apparatus according to claim 1, wherein the control device is adapted for storing and/or transferring to a commutation method the measured first induced voltage differential, the applied supply voltage, the position of the rotor and/or the commutation condition for the rotation of the motor connected to the phase connections.

7. The actuating apparatus according to claim 1, wherein the control device is configured for switching to a predeterminable commutation method when a rotary speed of the motor exceeds a predetermined threshold.

8. A motor control system, comprising:
an actuating apparatus; and
a motor having at least three phases;
wherein the actuating apparatus comprises:
   at least three phase connections, wherein each of the three phase connections of is connected to one of the at least three phases of the motor;
   a high-connection for applying of a supply voltage;
   a low-connection for applying of a reference potential of the supply voltage;
   at least three bridge branches having a series connection of a high-switch and a low-switch in each case;
   a control device for actuating the switches of the bridge branches;
   wherein the high-switch of each one of the bridge branches is connected to the high-connection;
   wherein the low-switch of each one of the bridge branches is connected to the low-connection;
   wherein each of the at least three phase connections is connected to exactly one of the at least three bridge branches between the high-switch and the low-switch of the respective bridge branch;
   wherein the control device is configured for actuating the switches of the bridge branches in such a manner that during a first time period a first phase connection of the three phase connections is switched to passive by disconnecting the first phase connection from the high-connection and the low-connection, and the second phase connection and third phase connection are alternatingly connected to the high-connection and the low-connection in a predetermined duty cycle if the supply voltage is applied,
   wherein the control device is configured for measuring a first induced voltage differential in the passive first phase connection during the first time period, and
   wherein the first induced voltage differential is created from changes in induction in the first connection resulting from alternatingly connecting the second phase connection and the third phase connection to the high-connection and the low-connection in the predetermined duty cycle.

9. A method for actuating a motor, comprising:
applying a supply voltage to a high-connection and applying a reference potential of the supply voltage at a low-connection of a bridge circuit having at least three bridge branches, each having a series connection of a high-switch and a low-switch;
wherein the high-switch of each one of the bridge branches is connected to the high-connection;
wherein the low-switch of each one of the bridge branches is connected to the low-connection;
wherein each one of the at least three bridge branches between the high-switch and the low-switch of the respective bridge branch is connected to a phase connection in each case;
actuating the switches of the bridge branches in such a manner that during a first time period a first phase connection of the three phase connections is switched to passive and the second and third phase connections are alternatingly connected to the high-connection and the low-connection in a predeterminable duty cycle; and
measuring a first induced voltage differential in the passive first phase connection during the first time period, wherein the first induced voltage differential is created from voltages induced by alternatingly connecting the second phase connection and the third phase connection to the high-connection and the low-connection in the predetermined duty cycle.

10. A non-transitory computer readable medium storing a program code, which, when executed by a processor, conducts the method according to claim 9.

* * * * *